United States Patent

Ishida et al.

Patent Number: 5,953,496
Date of Patent: Sep. 14, 1999

[54] METHOD AND APPARATUS FOR UTILIZING UNI-AND BIDIRECTIONAL PRINTING ON THE SAME PRINT MEDIUM

[75] Inventors: Goro Ishida; Masatoshi Matsuhira, both of Nagano, Japan

[73] Assignee: Seiko Epson Corporation, Tokyo, Japan

[21] Appl. No.: 08/921,691

[22] Filed: Sep. 2, 1997

[30] Foreign Application Priority Data

Sep. 2, 1996 [JP] Japan ................................ 8-232338
Sep. 2, 1996 [JP] Japan ................................ 8-232339

[51] Int. Cl.⁶ .................................................. B41J 19/18
[52] U.S. Cl. ........................ 395/108; 395/101; 395/107; 395/111; 395/112; 395/114; 395/117
[58] Field of Search ................................ 395/101, 107, 395/108, 111, 112, 114, 117

[56] References Cited

FOREIGN PATENT DOCUMENTS

| | | |
|---|---|---|
| 0 378 759 A2 | 7/1990 | European Pat. Off. ............... 395/108 |
| A20378759 | 7/1990 | European Pat. Off. ........... B41J 2/51 |
| A20578434 | 1/1994 | European Pat. Off. .......... H04N 1/18 |
| A20685820 | 12/1995 | European Pat. Off. ....... G06K 15/10 |
| 22051 | 1/1990 | Japan ............................... B41J 19/18 |
| 2233275 | 9/1990 | Japan ................................. B41J 2/51 |
| 49153 | 2/1992 | Japan ............................... B41J 2/485 |
| 5-096806 | 4/1993 | Japan ..................................... 395/108 |
| 811353 | 1/1996 | Japan ................................. B41J 2/51 |

*Primary Examiner*—David K. Moore
*Assistant Examiner*—Lance W. Sealey
*Attorney, Agent, or Firm*—Sughrue, Mion, Zinn, Macpeak & Seas, PLLC

[57] ABSTRACT

The number of lines in each of at least two printing areas is detected each time a print head conducts main scanning by detecting the presence or absence of dots of dot-pattern data on a line basis, the two printing areas being obtainable separately with a blank area therebetween with lines free from being printed. A decision is made on a printing direction by deciding specialized one-way printing for printing a printing block in the same direction as the direction of an immediately prior printing pass or specialized two-way printing for printing the printing block in a direction in which the movement of the print head becomes minimized in value. The printing block is what is to be printed through the next main scanning according to the relation between the number of lines in each of the printing and blank areas and the number of dot-forming elements of the print head.

16 Claims, 18 Drawing Sheets

METHOD AND APPARATUS FOR UTILIZING UNI-AND BIDIRECTIONAL PRINTING ON THE SAME PRINT MEDIUM

BACKGROUND OF THE INVENTION

1. Field of the Invention

The present invention relates generally to print systems, printer drivers and printers, and more particularly to a print system, a printer driver and a printer for use in driving a print head for carrying out serial printing.

2. Description of the Related Art

In a typical conventional print system; for example, in a serial non-impact ink-jet printer, it has been arranged that one-way or two-way printing is set selectable when monochromatic text data as to characters, numerals, ruled lines and the like is printed. By the one-way printing is meant that printing is carried out in one fixed direction and called a high-quality image printing mode, whereas the two-way printing means that printing is carried out in both lateral directions and called a high-speed printing mode.

In the case of one-way printing, printing is carried out in one fixed direction at all times and consequently printing time tends to increase as a printing pass, that is, the movement of a print head increases. However, one-way printing is advantageous in that high-quality printing can be carried out because the influence of a shift in the printing position due to the mechanical precision and the like of the print head is minimized.

In the case of two-way printing, on the other hand, printing can be carried out in both lateral directions and consequently the printing pass is halved in comparison with one-way printing, so that printing time is shortened. Since a shift in the printing position affects two-way printing, however, printing quality lowers as the discontinuity of printing dots becomes visually conspicuous when printing dots vertically linked together (in the sub-scanning direction) like vertically-double-sized characters and vertical ruled lines are printed.

For the reasons stated above, the user is allowed to designate either one-way or two-way printing to be used each time one printing job is done, that is, on a document basis by taking into consideration the character of a document to be printed. The user who prefers high-speed printing designates two-way printing, whereas the user who desires high-quality printing designates one-way printing. The whole printing job is controlled by the designated printing mode. When, therefore, one-way printing is designated, the one-way printing is totally employed for printing a document even though there exits a portion containing full-sized characters therein, whereas when two-way printing is designated, the two-way printing is totally employed even though there partially exist vertically-double-sized characters, vertical ruled lines and the like therein.

However, a document to be printed usually has, in combination, a portion containing full-sized characters and the like whose printing quality is free from deterioration ever when they are subjected to two-way printing, and another portion containing vertically-double-sized characters and the like whose printing quality is lowered unless they are subjected to one-way printing. Therefore, the designation of the one-way printing or two-way printing on a printing job basis results in increasing printing time due to an increase in undesired printing pass or otherwise nonconformity resulting from a partial deterioration in printing quality.

Japanese Patent Publication No. Hei. 4-9153 (Kokoku), Japanese Patents Publications No. Hei. 2-233275 and No. Hei. 8-11353 (Kokai), for example, disclose the art of deciding which one of the one-way and two-way printing to choose by analyzing the image data that have been developed.

In the art described in Japanese Patent Publication No. Hei. 4-9153 (called the art described in the first publication), one-way printing is employed when the number of vertical dots is greater than predetermined width in a pattern that is developed and when a character pattern is imaged into a plurality of zones, whereas two-way printing is employed when a character pattern is imaged in a single zone.

In the art described in Japanese Patent Publication No. Hei. 2-233275 (the art described in the second publication), a decision is made on whether two-way printing or one-way printing is used according to the position where a vertical dot-line break is detected.

In the art described in Japanese Patent Publication No. Hei. 8-11353 (called the art described in the third publication), a decision is made on the reversion or non-reversion of the direction in which a print head is fed by analyzing the dimension in the height direction of a character string on the basis of attribute information and taking into consideration the continuity of image data.

In the art described in the first publication, one-way printing can be switched to two-way printing and vice versa, depending on the size of the developed character pattern. Therefore, it is possible to make not only printing time shorter but also printing quality better than in the art of choosing between one-way and two-way printing on a printing job basis.

However, in the art described in the first publication, the selection of one-way printing or two-way printing is only based on whether the character pattern on a certain line has been zoned and no consideration has been given to the relation in size between the character pattern and other character patterns located above and below the character pattern in question. Consequently, an undesired printing pass cannot completely be removed and the problem is that the shortest printing time has not been attained yet. When a character pattern on a certain line consists of full-sized characters, for example, this line is printable through one main scanning. Nevertheless, there is a case where the printing pass is not reducible unless the relation with other adjoining lines is taken into consideration.

Similarly in the art described in the second publication, the number of printing passes may increase, depending on the relation between the height of the character string that follows the dot-line break and the head dimensions, since no consideration has been given to the size of the next image data that follows the dot-line break thus detected.

The art described in the third publication is superior in point of the fact that the apex and the lowest part of a character are detected according to the attribute information, and even the presence or absence of the apex of a character on the next line, that is, the next character data that follows the blank area and image data are taken into consideration. In the art described in the third publication, however, the printing of the whole data stored in a buffer is controlled by the printing direction obtained by analyzing the attribute information. More specifically, the specific printing logic based on the analysis of attribute information is applied to the whole data stored in the buffer and intended for printing. Notwithstanding, the art described in the third publication is still problematical in that each time a blank area having no data to be printed is actually detected, there may arise a case where it is needed to decide whether to reverse the printing direction in the blank area or to print printing areas before and after the blank area; in other words, the art described therein is incapable of dealing with this case.

SUMMARY OF THE INVENTION

An object of the present invention is to provide a print system, a printer driver and a printer so designed that while printing time is being shortened, printing quality is prevented from being deteriorated in a case where a pattern made printable by two-way printing and a pattern made printable by one-way printing are present in combination.

Another object of the present invention is to provide a print system, a printer driver and a printer so designed as to not only achieve high-speed printing and high-quality printing simultaneously but also make reducible the quantity of memory for storing dot-pattern data.

These and other objects and advantages of the present invention will be more clearly understood by following detailed description.

According to the present invention, dot-pattern data obtainable according to printing contents is analyzed each time main scanning is conducted, so that a pattern which is printable by specialized two-way printing is printed in specialized two-way directions and a pattern which should be printed by specialized one-way printing is printed in an specialized one-way direction. More specifically, according to the present invention, the number of lines in each of at least two printing areas which are obtainable separately with a blank area therebetween is detected each time scanning is conducted, and printing logic is variably controlled on the basis of the number of lines in each of the printing and blank area and of the number of dot-forming elements of a print head.

As one preferred embodiment of the present invention, there is provided a print system for embodying printing contents on a recording medium, comprising: a host computer; a printer which is coupled to the host computer and has a print head formed with a plurality of dot-forming elements therein; dot-pattern data generating means for generating dot-pattern data according to the printing contents; area detecting means for detecting the number of lines in each of at least two printing areas each time the print head conducts main scanning by detecting the presence or absence of dots of the dot-pattern data on a line basis, the two printing areas being obtainable separately with a blank area therebetween with lines free from being printed; printing-direction decision means for deciding a printing block to be printed through the next main scanning, and for selecting one of the following two printing direction modes: (A) specialized one-way printing for printing a printing block in the same direction as the direction of an immediately prior printing pass or (B) specialized two-way printing for printing the printing block in a direction in which the movement of the print head becomes minimized in value, based on the relation between the number of lines in each of the printing and blank areas and the number of dot-forming elements of the print head; and drive control means for controlling at least the driving of the print head according to the result decided by the printing-direction decision means.

DETAILED DESCRIPTION OF THE PREFERRED EMBODIMENTS

A detailed description will subsequently be given of an embodiment of the present invention with reference to the drawings.

First, referring to FIGS. 1–15, a description will first be given of the principal part embodying the present invention applied to a printer controller side 9.

Figure 1:
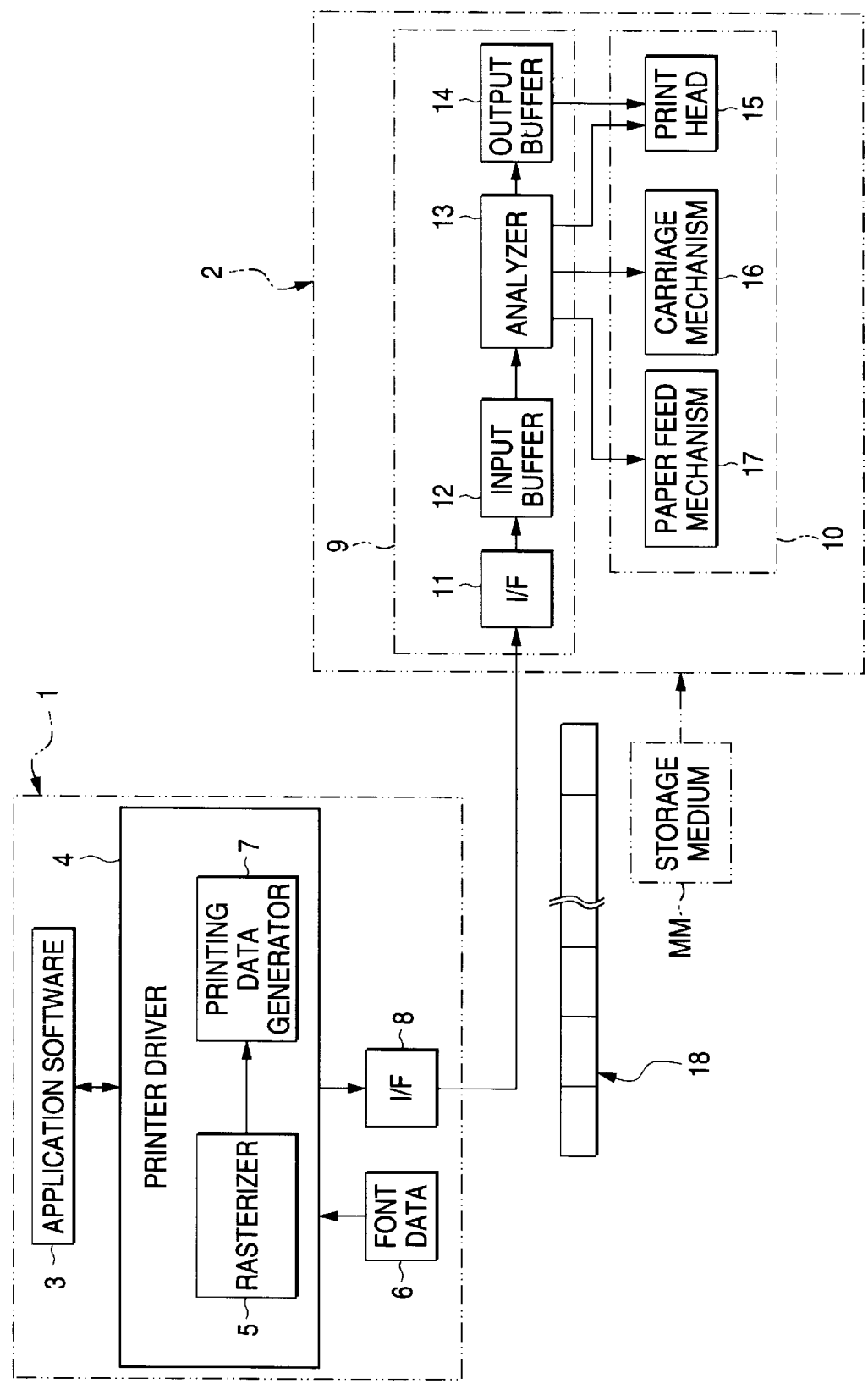
FIG. 1 is a schematic block diagram of the principal part of the present invention applied to a printer.

FIG. 1 is a block diagram of the principal part of the present invention applied to a printer 2. This print system is, as will be described later, designed to obtain a desired printing result by causing the printer side 2 to analyze the printing data 18 generated by a host computer 1 and transmitted to the printer 2.

Application software 3 such as software for preparing documents operates on the host computer 1 so as to generate source codes by calling various functions•procedures provided for a printer driver 4. The rasterizer 5 of the printer driver 4 refers to font data 6 and the like and develops the source code into dot-pattern data on an image memory (not shown). In this case, the rasterizer 5 develops, page by page, the printing contents created by the application software 3 into dot-pattern data.

Further, a printing data generator 7 generates raster data of one dot line and printing data 18 having printing position data in the vertical direction of the raster data. The printing data 18 thus created is sent via an interface (hereinafter called the "I/F") to the printer 2. The host computer 1 is equipped with memory resources (e.g., including data and image memories) for use in storing and reading out various data at random, and computer resources such as CPU resources (neither of them is shown) for performing operations on data, these computer resources being utilized by the printer driver 4 embodied in the host computer 1.

The printer 2 is constituted of the printer controller 9 as a "drive controlling means" and a print engine 10. The printer controller 9 receives the printing data 18 from the host computer 1 via an I/F 11 as a "printing-data receiving means" and stores the printing data 18 thus received in an input buffer 12 as a "dot-pattern data generating means." The input buffer 12 stacks up the raster data of one dot line transmitted from the host computer 1 in the vertical direction (a sub-scanning direction) in order to create dot-pattern data.

In a case where the printing data 18 transmitted from the host computer 1 is not the raster data but what contains character codes and graphic functions, the built-in image processor (not shown) of the printer controller 9 refers to font data, graphic function data and the like whereby to create dot-pattern data.

An analyzer 13 analyzes the dot-pattern data read from the input buffer 12, determines a printing block to be printed with one main scanning and decides the direction in which the printing block is printed. More specifically, the analyzer 13 is equivalent to an "area detecting means" and a "printing-direction decision means." The analyzer 13 sends the dot-pattern data to an output buffer 14 and feeds the vertical printing position data (the printing position in the sub-scanning direction) and the like within the printing data 18 into the corresponding elements of the print engine 10.

The print engine 10 of an ink-jet type, for example, is equipped with a print head 15, a carriage mechanism 16 and a paper feed mechanism 17. In the print head 15, a number of dot-forming elements are formed in the sub-scanning direction. Each dot-forming element comprises, for example, a nozzle hole, an ink channel, an ink discharge mechanism and the like. The print head 15 causes a predetermined dot-forming element at predetermined timing corresponding to the dot-pattern data stored in the output buffer 14 to discharge ink whereby to carry out printing on paper as a printing-recording medium. The carriage mechanism 16 includes the carriage on which the print head 15 is mounted, a carriage motor for traveling the carriage via a timing belt and so forth, thus making the print head 15 conduct the main scanning. The paper feed mechanism 17 includes a paper feed roller, a paper feed motor and the like, and conducts the sub-scanning while successively feeding copying paper.

Incidentally, the aforesaid printer controller 9 is normally formed as a microcomputer system containing CPU, ROM, RAM and the like. The contents of control processing to be performed by the printer controller 9 have been written to the ROM. Therefore, the program stored in a storage medium MM, which program is made readable by a computer within the printer 2, is read by the computer, whereby the contents processed by the printer controller 9 are embodied on the computer of the printer 2.

The storage medium is not limited to an internal storage medium including RAM, ROM and the like but may be an external storage medium such as a floppy-disk, a hard disk, a CD-ROM, an IC card, a photomagnetic disk, a magnetic tape or the like. Further, the storage medium is not limited to a portable, independent article but may be such that a program is embodied in the printer controller 9 by down loading from a server via, for example, a network (a communication medium) into the computer of the printer 2.

Figure 2:
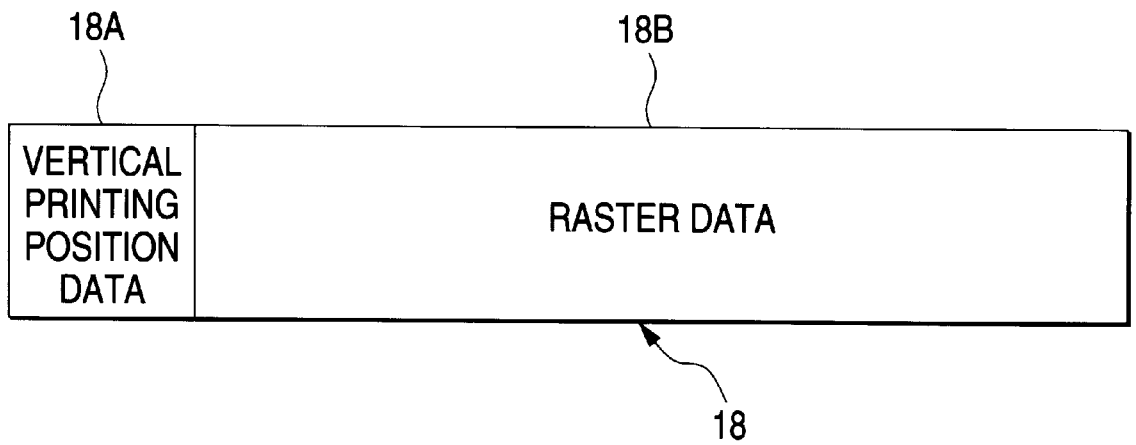
FIG. 2 is a diagrammatic illustration of the structure of printing data.

An example of the printing data 18 sent out of the host computer 1 will subsequently be described by reference to FIG. 2. The printing data 18 includes vertical printing position data 18A and raster data 18B. The printer driver 4 is adapted to transmit, on a one-dot-line basis, dot-pattern data of one page that the rasterizer 5 has developed. Therefore, the vertical printing position data 18A and the raster data 18B are alternately sent to the printer 2.

Figure 3:
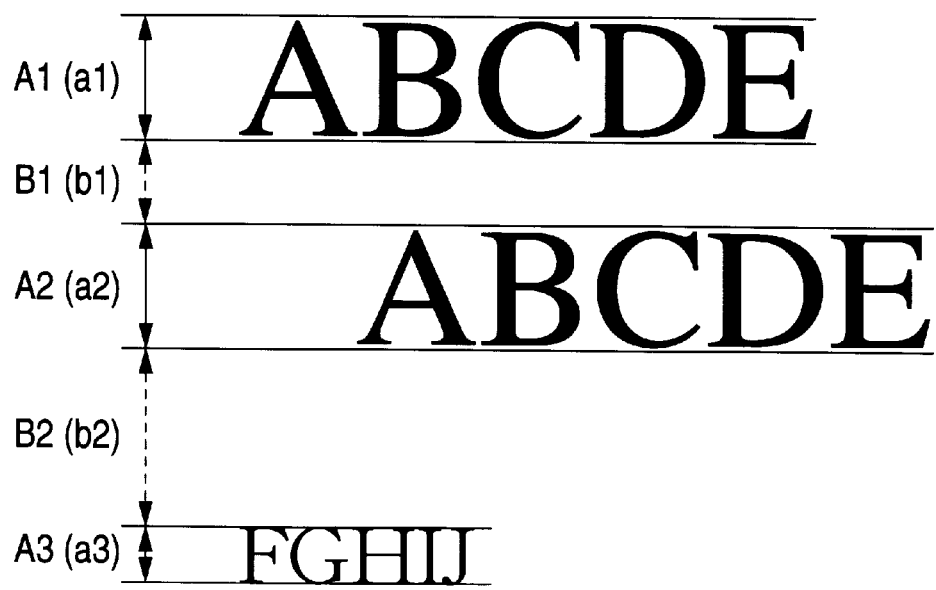
FIG. 3 is a diagrammatic illustration of a concept of printing and blank areas.

A detailed description will subsequently be given of a printing algorithm for determining the printing direction. In FIG. 3, there are shown two enlarged character strings "ABCDE" and a standard character string "FGHIJ." The printing contents on page space can be grasped as an aggregate in which a number of one-dot lines are arranged in the sub-scanning direction.

In this specification of the invention, an area where a continuous line containing dots (data) to be struck runs in the sub-scanning direction is called the "printing area," whereas a continuous line without containing dots to be struck runs in the sub-scanning direction is called the "blank area; however, the printing and blank areas include cases where single lines run, respectively.

Figure 4:
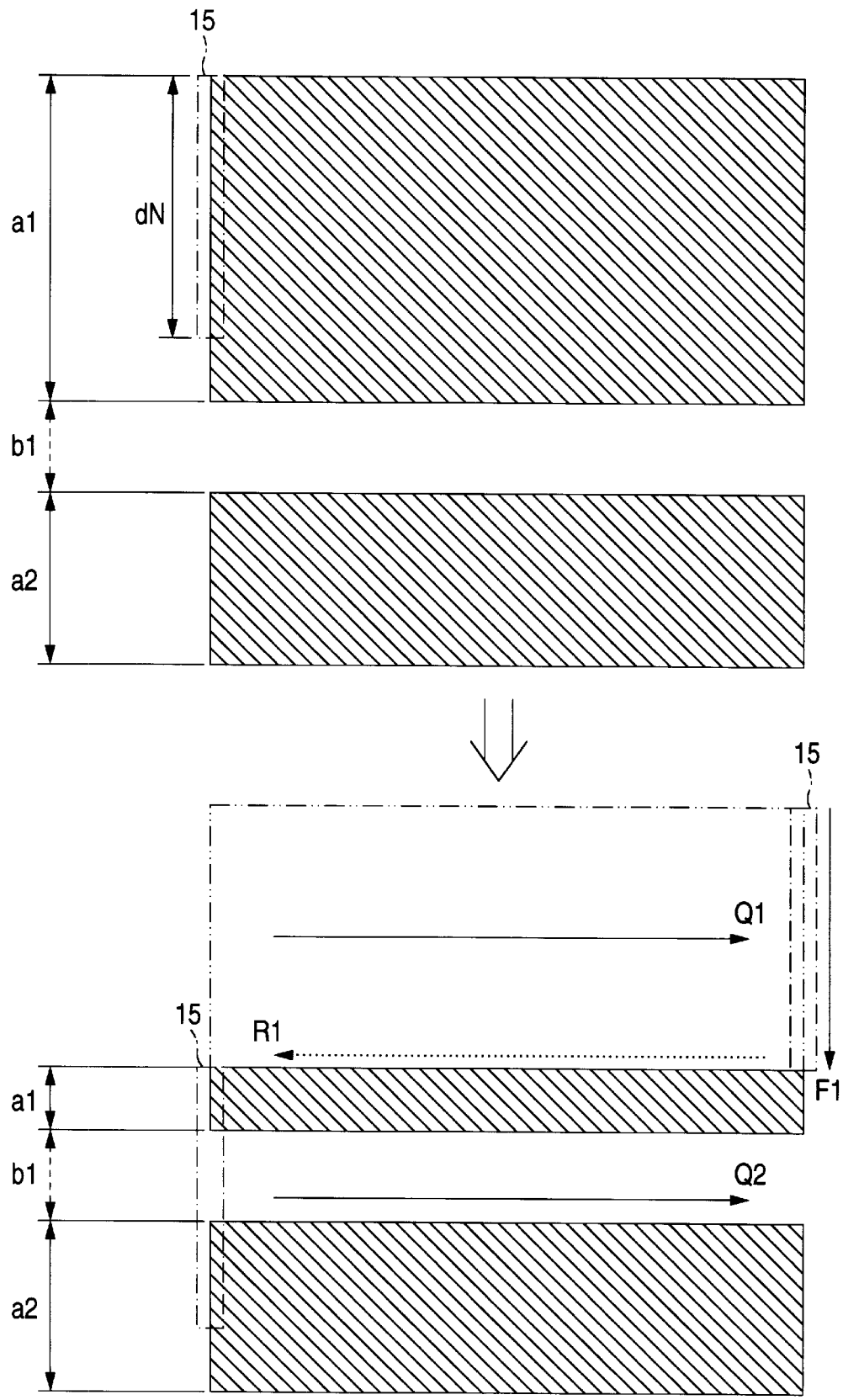
FIG. 4 is a diagrammatic illustration of a printing pass in the case of dN<a1.

FIG. 3 shows a first printing area A1 with the number of lines=a1 including the enlarged character string "ABCDE," a first blank area B1 with the number of lines=b1, a second printing area A2 with the number of lines=a2 including the next enlarged character string "ABCDE," a second blank area B2 with the number of lines=b2, and a third printing area A3 with the number of lines=a3 including the standard character string. When the enlarged character string "ABCDE" has a height of 48 dots, for example, the number of lines a1, a2 in the first and second dot-pattern data A1, A2 is 48 in both cases. Given that the number of dot-forming elements of the print head 15 is dN, the relation between the number of dot-forming elements dN and the number of lines a1, b1, a2 of the respective areas A1, B1, A2 is classified according to the following. In the description with reference to FIG. 4 and thereafter, each printing area is shown with slanting lines:

(1) In the case of dN<a1:

The number of dot-forming elements dN of the print head 15 is smaller than the number of lines a1 in the first printing area (dN<a1) as shown in FIG. 4. In this case, the first printing area A1 is not wholly printable at a time through the main scanning by the print head 15. Since the dots are continuous in the sub-scanning direction longer than the print head 15, moreover, the application of two-way printing may deteriorate printing quality due to a shift in the printing position. Therefore, "specialized one-way printing" is carried out when dN<a1.

The concept of the specialized one-way printing in this case refers to extending the ordinary one-way printing wherein the direction of printing pass is restricted in the same direction of printing pass. In the ordinary one-way printing, printing is started from one predetermined direction, for example, left→right. On the other hand, printing can be started from any one of the directions: left→right or right→left in the specialized one-way printing. In other words, when a certain pass is used for left→right printing in the specialized one-way printing, the following pass is also used for left→right printing, whereas when a certain pass is used for right→left printing, the next pass is also used for right→left printing.

In the case of dN<a1, as shown in the lower side of FIG. 4, the main scanning by the print head 15 as well as paper feeding is controlled. First, the print head 15 is moved from the left end to the right end in FIG. 4 so as to effect main scanning Q1, whereby a printing area equivalent to the number of dot-forming elements of the print head 15 is printed. A chain double-dashed line indicates a printed range.

Subsequently, paper feeding F1 by dN is carried out and the print head 15 is idly returned to the original position (R1). Further, the printing area left over by the main scanning Q1 is printed by conducting main scanning Q2 again in the same direction as that of the main scanning Q1. The detection of each of the areas A1, B1, A2 in this case is made on a main scanning basis. Consequently, the number of lines a1 in the first printing area is reduced by the number of lines (dN) in the already printed area through the first main scanning Q1 (a1=a1−dN).

Figure 5:
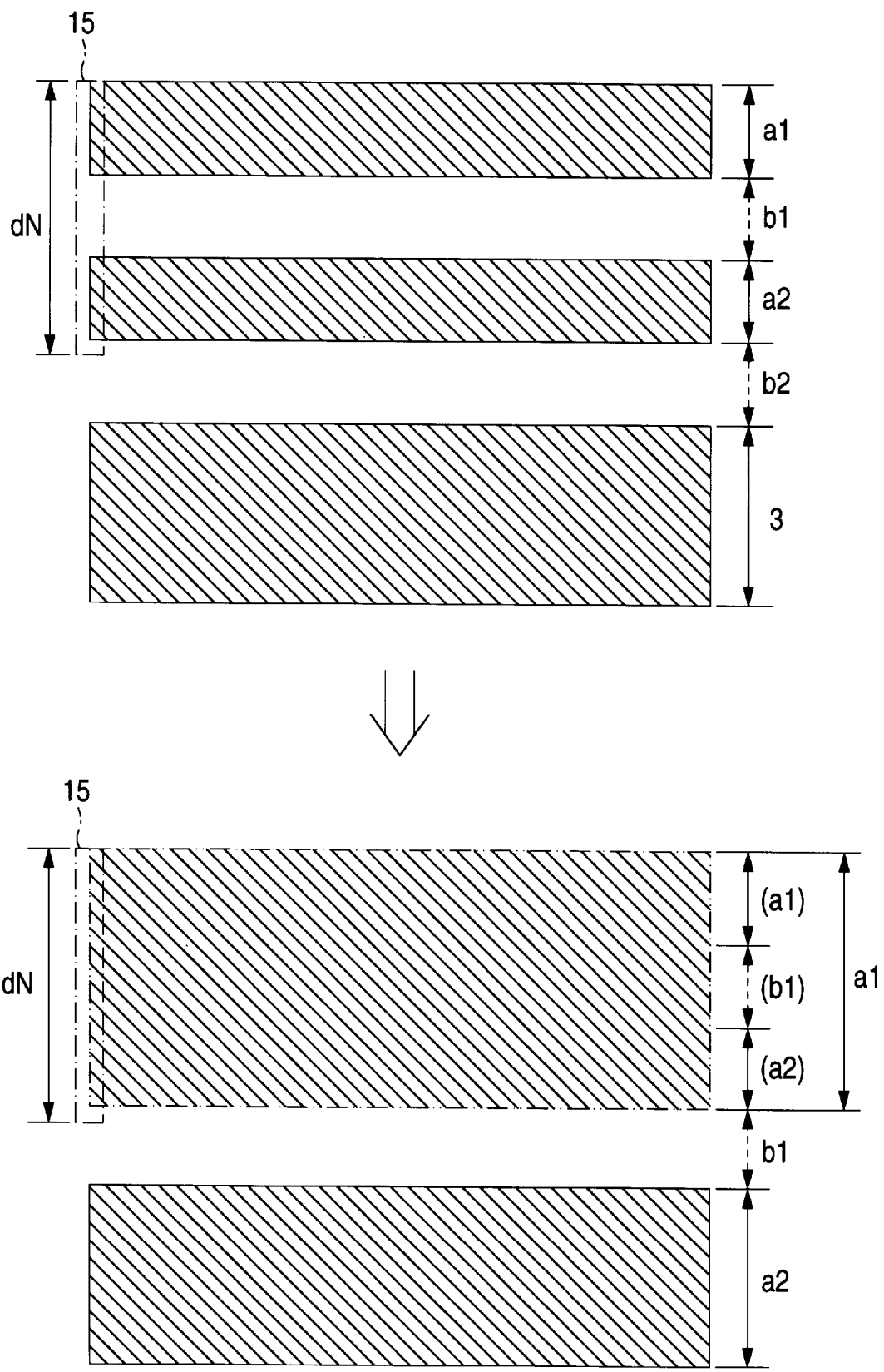
FIG. 5 is a diagrammatic illustration of the printing pass in the case of a1+b1+a2≦dN.

(2) In the case of a1+b1+a2≦dN:

The number of dot-forming elements dN of the print head 15 is not less than the total number of lines (a1+b1+a2) from the head of the first printing area A1 up to the end of the second printing area A2 as shown in FIG. 5. In this case, each of the areas A1, B1, A2 are replaced with the first printing area A1 so as to make a decision again without determining the printing direction. In other words, a1=a1+b1+a2, b1=b2, a2=a3 are respectively replaced as shown in the lower side of FIG. 5. When horizontal lines having a width of one dot are alternately drawn, for example, the one-dot horizontal lines are brought together to the extent that these lines stay in the print head 15 and processed as the first printing area A1.

Figure 6:
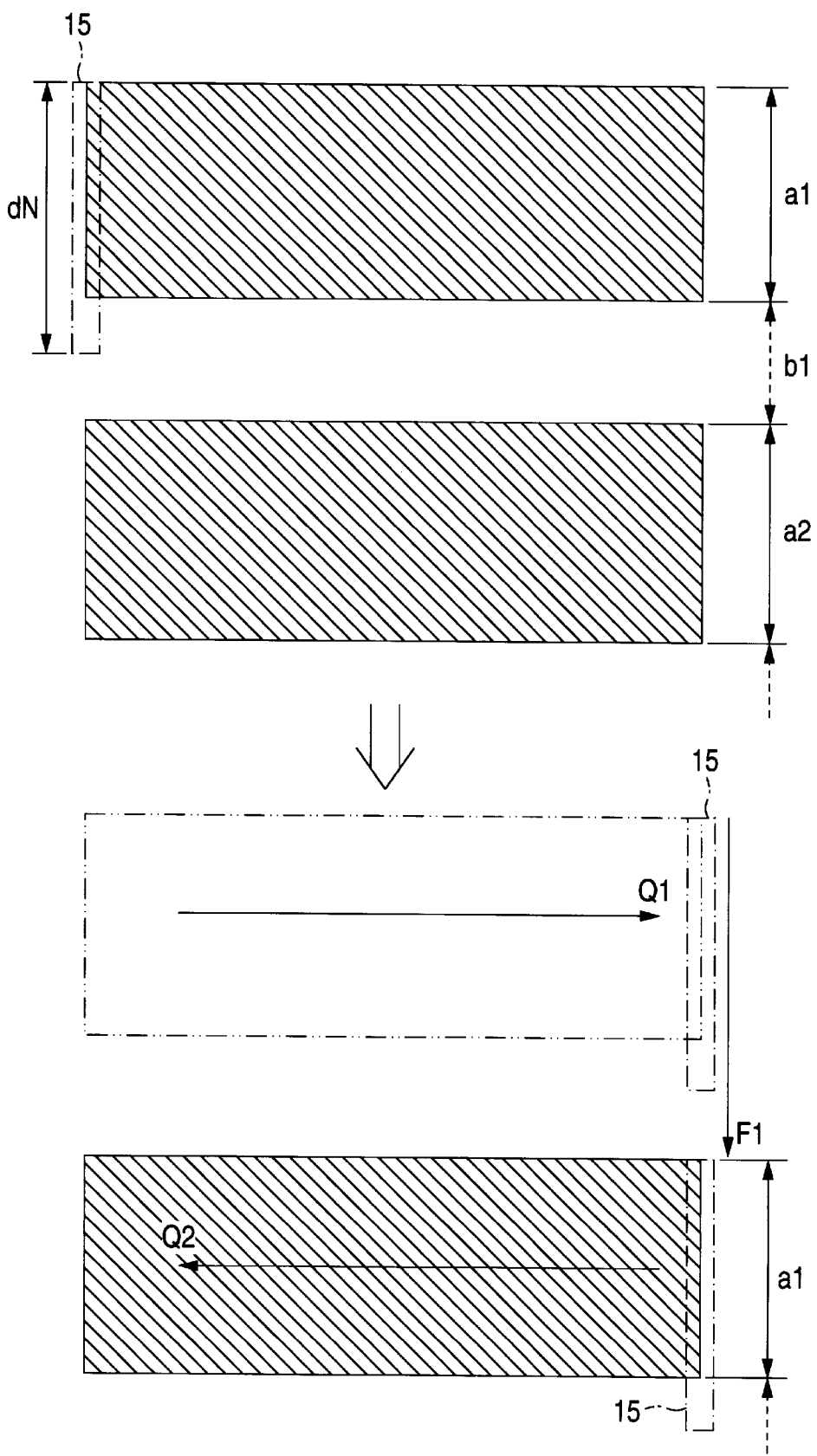
FIG. 6 is a diagrammatic illustration of the printing pass in the case of a1≦dB≦a1+b1.

(3) In the case of a1≦dN≦a1+b1:

The print head 15 covers the whole first printing area A1 but is unable to reach the second printing area A2 as shown in FIG. 6. In this case, the first printing area A1 is subjected to the "specialized two-way printing."

The concept of the specialized two-way printing in this case refers to extending the ordinary two-way printing and is intended not to simply reverse the printing direction each time main scanning is conducted but to determined the printing direction in such a manner as to minimize the movement of the print head 15. The method of minimizing the movement of the print head like this is called so-called "logical seek." About the logical seek, the description thereof was given in, for example, Japanese Patent Publications No. Hei. 4-53187 (Kokoku), No. Hei. 4-63784 (Kokoku) and No. Sho. 63-56866 (Kokoku).

As shown in the lower side of FIG. 6, the main scanning Q1 is conducted so as to subject the first printing area A1 to the specialized two-way printing. Then paper feeding F1 is carried out to the extent of the number of lines a1 in the first printing area A1+the number of lines b1 in the first blank area B1. Further, the second printing area A2 prior to conducting the main scanning Q1 is detected newly as the first printing area A1 and printed through the main scanning Q2 opposite in direction to the main scanning Q1. When the left end of the second printing area A2 is located to the right of the right end of the first printing area A1 in the upper side of FIG. 6, for example, the direction of the main scanning Q2 second time becomes equal to the direction of the main scanning Q1 first time.

(4) In the case of a1+b1<dN<a1+b1+a2:

The print head 15 reaches the midway of the second printing area A2 as shown in FIGS. 7–10.

In this case, there are the following two methods of deciding the printing direction.

(I) The first method is to print only the first printing area A1 by specialized two-way printing and then to print the second printing area A2 by the specialized one-way printing.

(II) The second method is to print the whole including the first printing area A1 by the specialized one-way printing. The printing pass in each type of FIGS. 7–10 with reference to the aforesaid (I), (II) will be examined.

(4-1) In the case of FIGS. 7(a) and 7(b):

As shown in FIG. 7(a), the first printing area A1 and the second printing area A2 are subjected to the specialized two-way printing and the specialized one-way printing, respectively. In this case, the main scanning Q1 is first conducted to print only the first printing area A1 by the specialized two-way printing. Subsequently, paper feeding F1 is carried out only to the extent of the number of lines a1 in the first printing area A1+the number of lines b1 in the first blank area B1 and the print head 15 is aligned with the head of the second printing area A2. Then the main scanning Q2 is conducted to subject the upper side of the second printing area A2 to the specialized one-way printing to the extent of the number of dot-forming elements dN, and paper feeding F2 equivalent to the number of dot-forming elements dN is carried out. Further, the print head 15 is returned through non-print scanning R1 to the original position and main scanning Q3 is conducted to print the lower side of the second printing area A2. Consequently, the total number of passes required for printing in this case amounts to "4" of Q1, Q2, R1, Q3.

FIG. 7(b) refers to a case where the whole of the first printing area A1–the second printing area A2 is subjected to the specialized one-way printing. In this case, the main scanning Q1 is conducted to carry out the specialized one-way printing to the extent of the number of dot-forming elements dN initially. With this main scanning Q1, the whole of the first printing area A1 and part of the upper side of the second printing area A2 are printed. Subsequently, the paper feeding F1 equivalent to the number of dot-forming elements dN is carried out. Then the non-print scanning R1 is conducted to return the print head 15 to the home position and the main scanning Q2 is conducted. Similarly, the paper feeding F2, non-print scanning R2 and the main scanning Q3 are effected so as to terminate the printing operation. Consequently, the total number of passes required for printing in this case amounts to "5" of Q1, R1, Q2, R2, Q3.

(4-2) In the case of FIGS. 8(a) and 8(b):

FIG. 8(a) also refers to a case where only the first printing area A1 is subjected to the specialized two-way printing, and the second printing area A2 is subjected to the specialized one-way printing. The total number of passes required for printing in this case amounts to "4" of Q1, Q2, R1, Q3.

Figure 7:
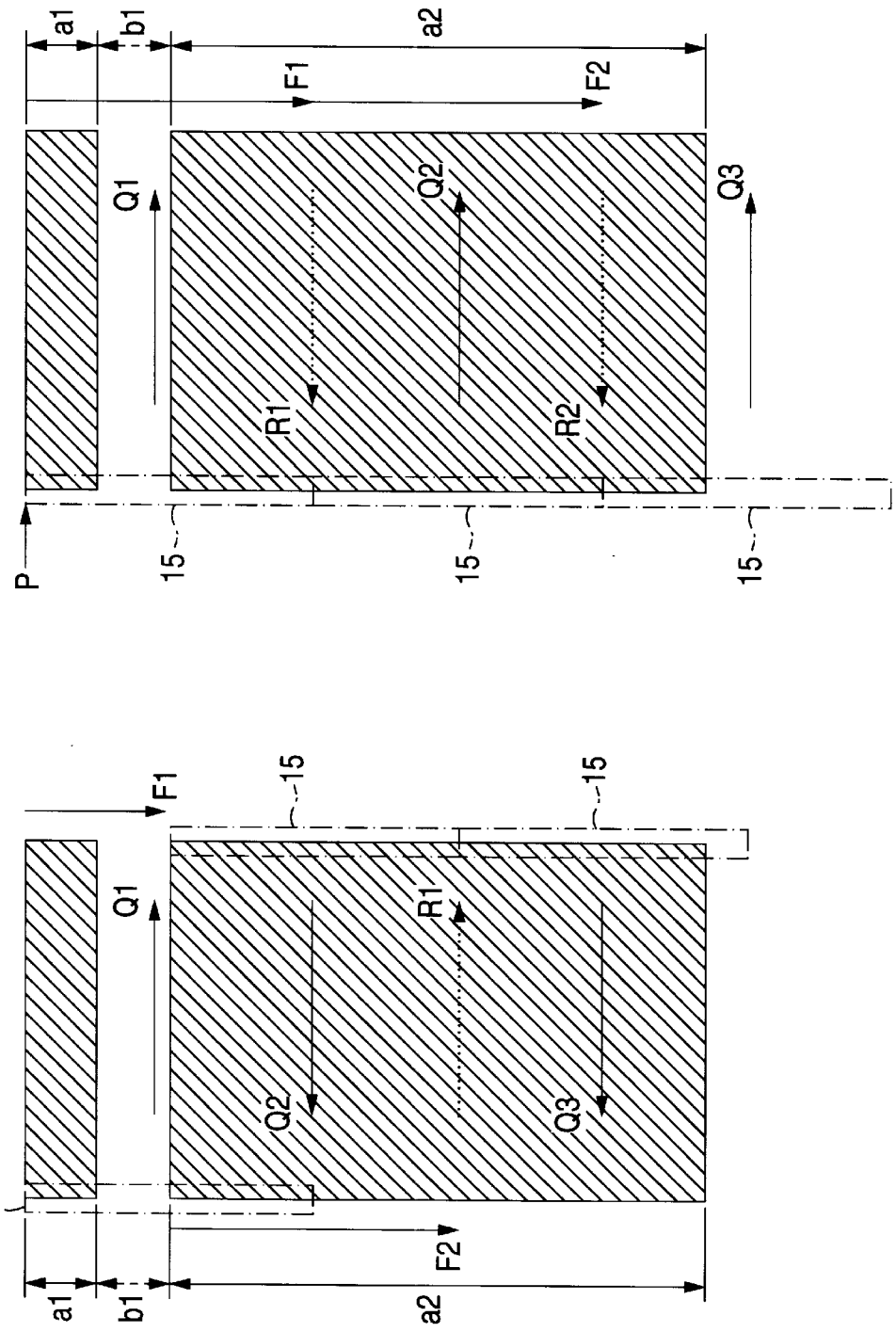
FIGS. 7(a) and 7(b) are diagrammatic illustrations of the printing pass in the case of a1+b1<dN<a1+b1+a2.
Figure 8:
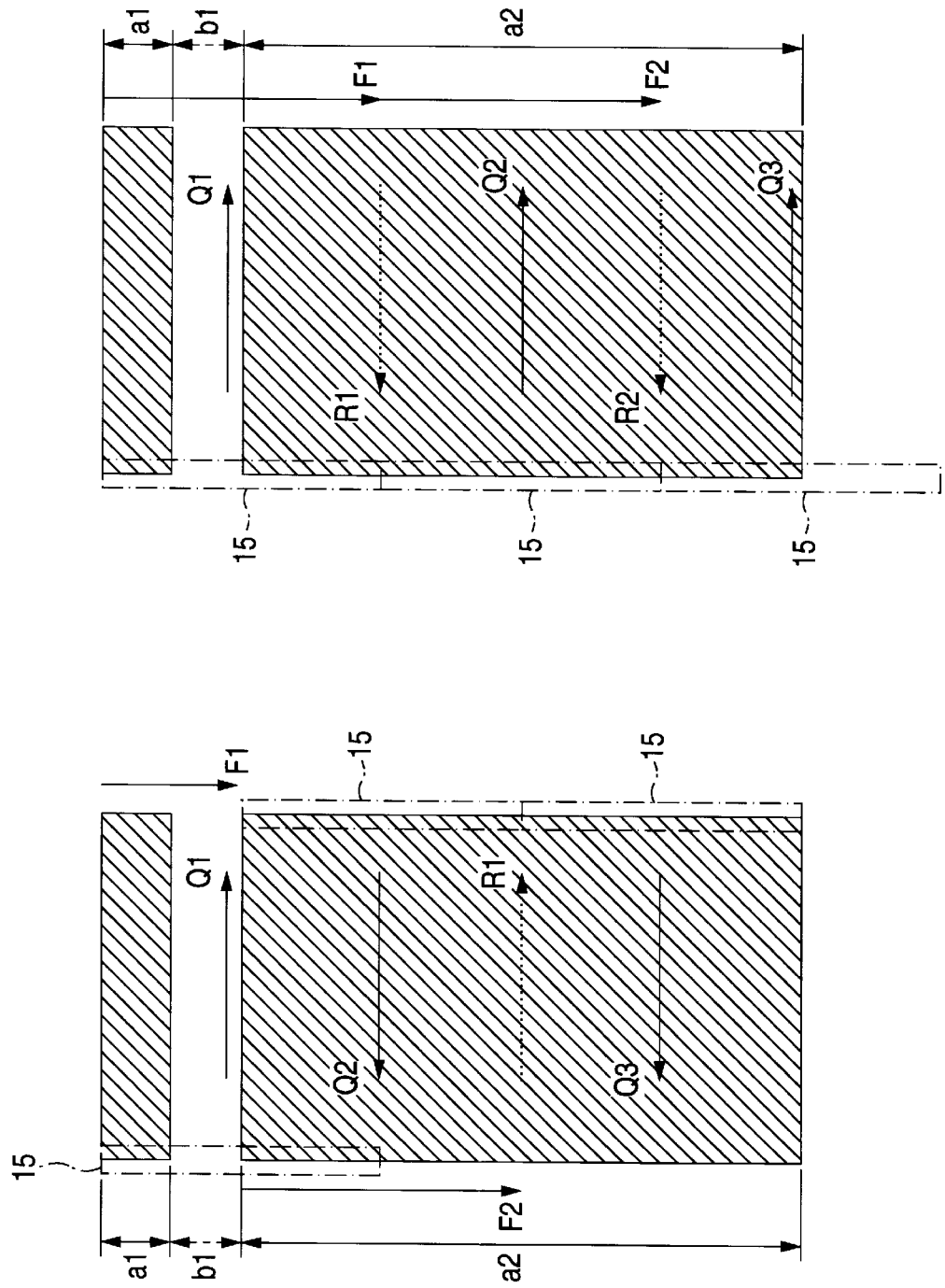
FIGS. 8(a) and 8(b) are diagrammatic illustrations of another printing pass in the case of a1+b1<dN<a1+b1+a2.

On the other hand, FIG. 8(b) refers to a case where the whole is subjected to the specialized one-way printing. The total number of passes required for printing in this case amounts to "5" of Q1, R1, Q2, R2, Q3. Consequently, it will be understood that the total number of passes required for printing in both cases of FIGS. 7–8 is made rather reducible by subjecting only the first printing area A1 to the specialized two-way printing and further subjecting the second printing area A2 to the specialized one-way printing.

(4-3) In the case of FIGS. 9(a) and 9(b):

FIG. 9(a) also refers to a case where only the first printing area A1 is subjected to the specialized two-way printing, and the second printing area A2 is subjected to the specialized one-way printing. The total number of passes required for printing in this case amounts to "6" of Q1, Q2, R1, Q3, R2, Q4. On the other hand, FIG. 9(b) refers to a case where the whole is subjected to the specialized one-way printing, the total number of passes required for printing in this case amounts to "5" of Q1, R1, Q2, R2, Q3.

(4-4) In the case of FIGS. 10(a) and 10(b):

FIG. 10(a) also refers to a case where only the first printing area A1 is subjected to the specialized two-way printing, and the second printing area A2 is subjected to the specialized one-way printing. The total number of passes required for printing in this case amounts to "6" of Q1, Q2, R1, Q3, R2, Q4.

Figure 9:
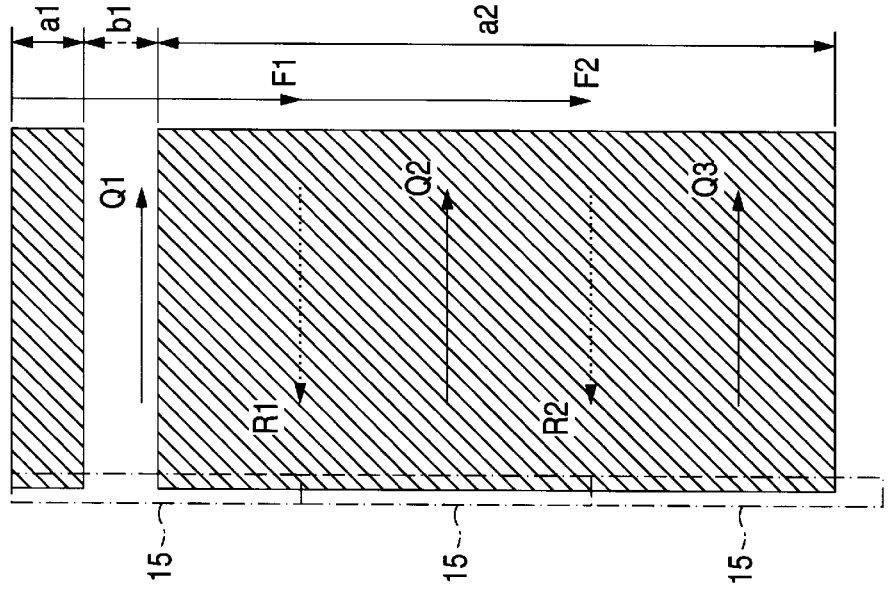
FIGS. 9(a) and 9(b) are diagrammatic illustrations of still another printing pass in the case of a1+b1<dN<a1+b1+a2.
Figure 9:
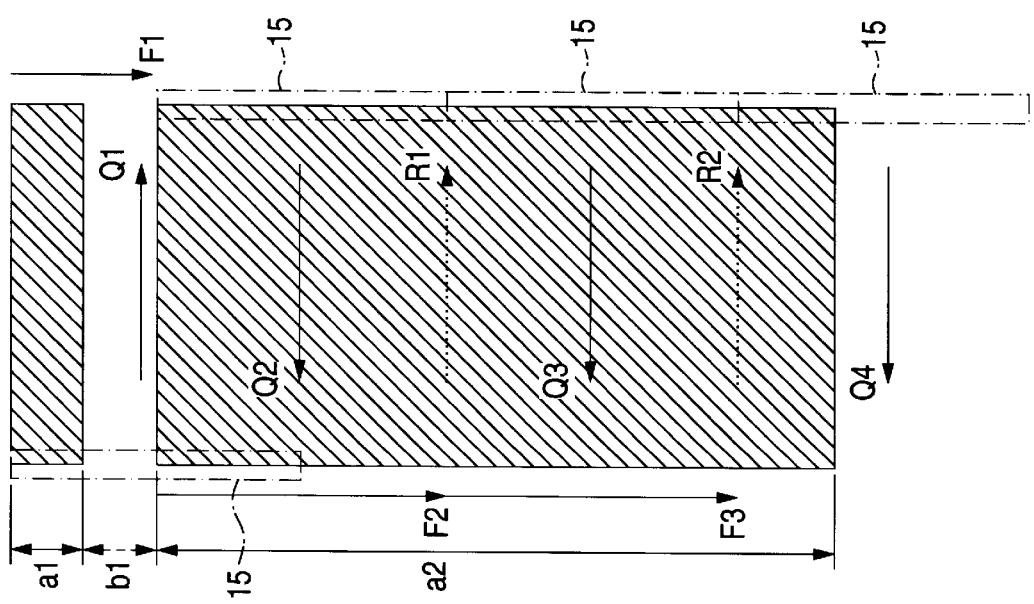
Figure 10:
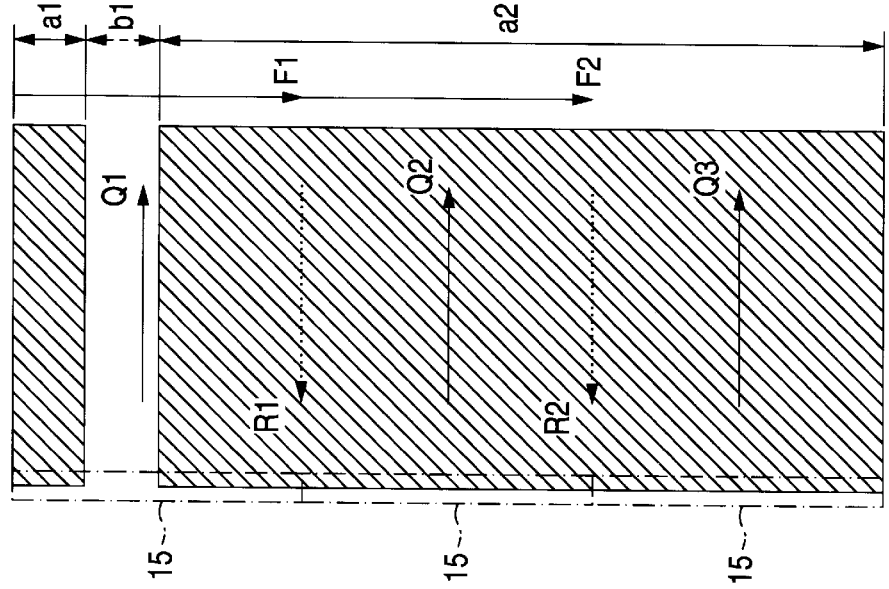
FIGS. 10(a) and 10(b) are diagrammatic illustrations of a further printing pass in the case of a1+b1<dN<a1+b1+a2.
Figure 10:
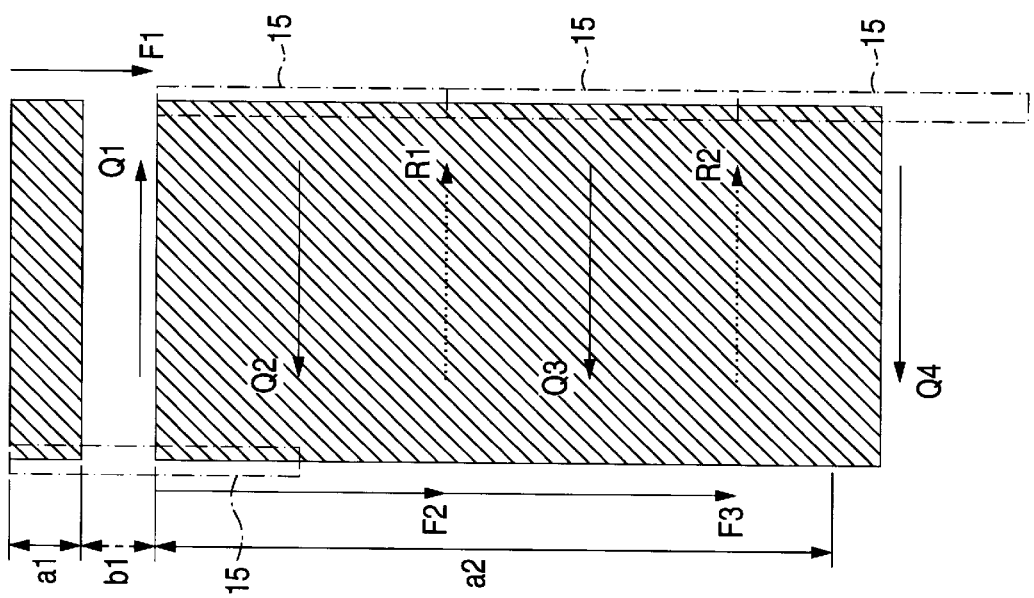

On the other hand, FIG. 10(b) refers to a case where the whole is subjected to the specialized one-way printing. The total number of passes required for printing in this case amounts to "5" of Q1, R1, Q2, R2, Q3. Consequently, the total number of passes required for printing in both cases of FIGS. 9–10 is made rather reducible by subjecting the whole of the first printing area A1–the second printing area A2 to the specialized one-way printing.

(4-5) Decision of discriminant:

As examined in FIGS. 7–10, the preferable printing logic varies with the relation between each of the areas A1, B1, A2 and the print head 15. Therefore, the size relationship among the total number of passes in FIGS. 7–10 is generalized, so that a discriminant for use in adopting the printing logic is decided.

First, a value obtainable by dividing the number of lines a2 in the second printing area A2 by the number of dot-forming elements dN (=a2/dN) is rounded-up to obtain an integer, which value is defined as mB. On the other hand, a value obtainable by dividing the total number of lines ranging from the first printing area A1 up to the second printing area A2 by the number of dot-forming element dN ((a1+b1+a2)/dN) is rounded up to obtain an integer, which value is defined as mU.

When mB<mU is established, this means that the total number of passes required for printing is decreased by subjecting only the first printing area A1 to the specialized two-way printing and subjecting the second printing area A2 to the specialized one-way printing. In both cases of FIGS. 7–8, mB=2, mU=3, so that mB<mU is established.

When mB<uU is not established, this means that the total number of passes required for printing is decreased by subjecting the whole of the first printing area A1–the second printing area A2 to the specialized one-way printing. In both cases of FIGS. 9–10, mB=3, mU=3, that is, mB=mU, so that mB<mU is not established. Incidentally, this discriminant is suitably usable in second and third embodiments of the present invention as will be described later.

1st Embodiment

Figure 11:
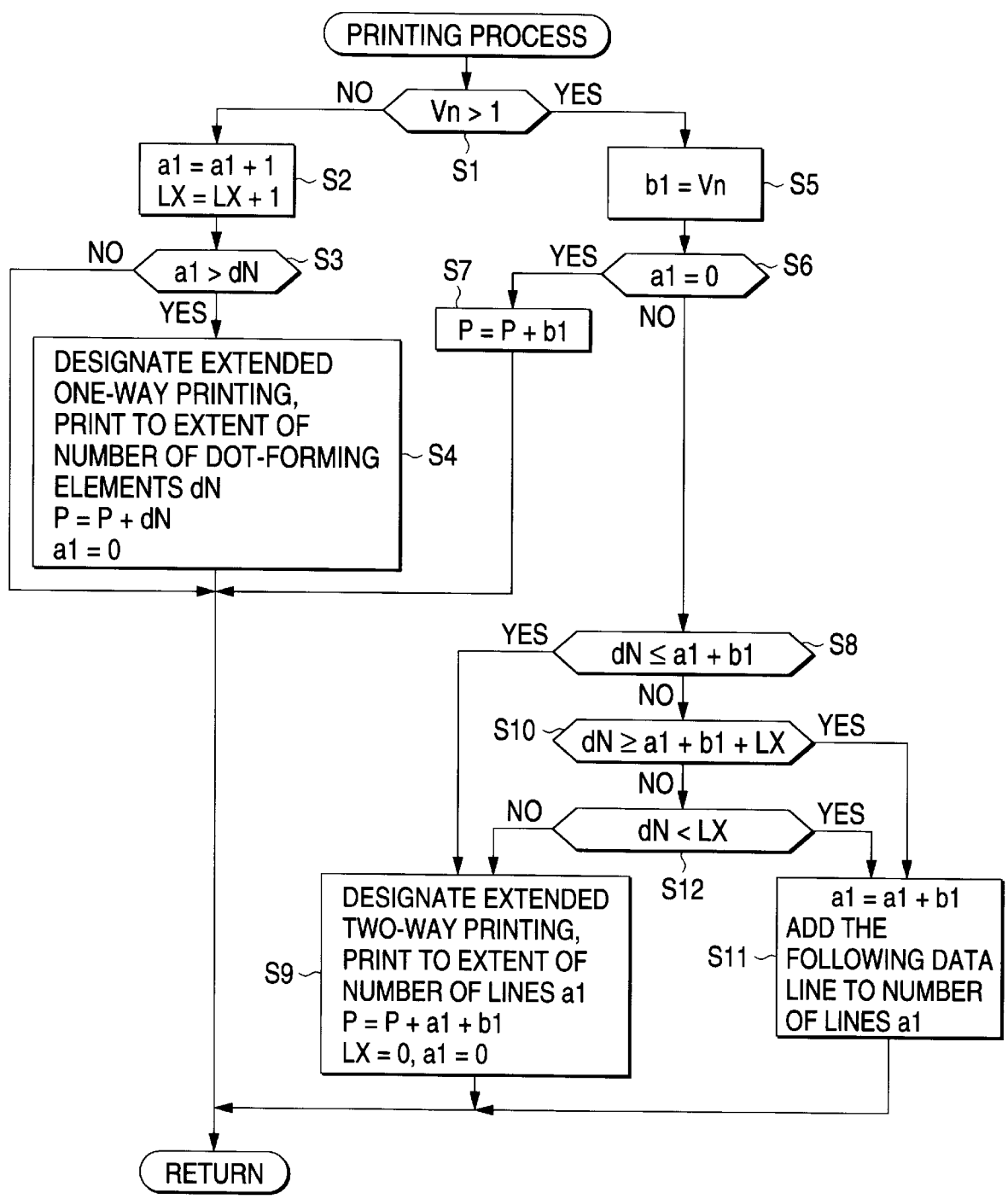
FIG. 11 is a flowchart showing a printing process according to a first embodiment of the present invention.
Figure 12:
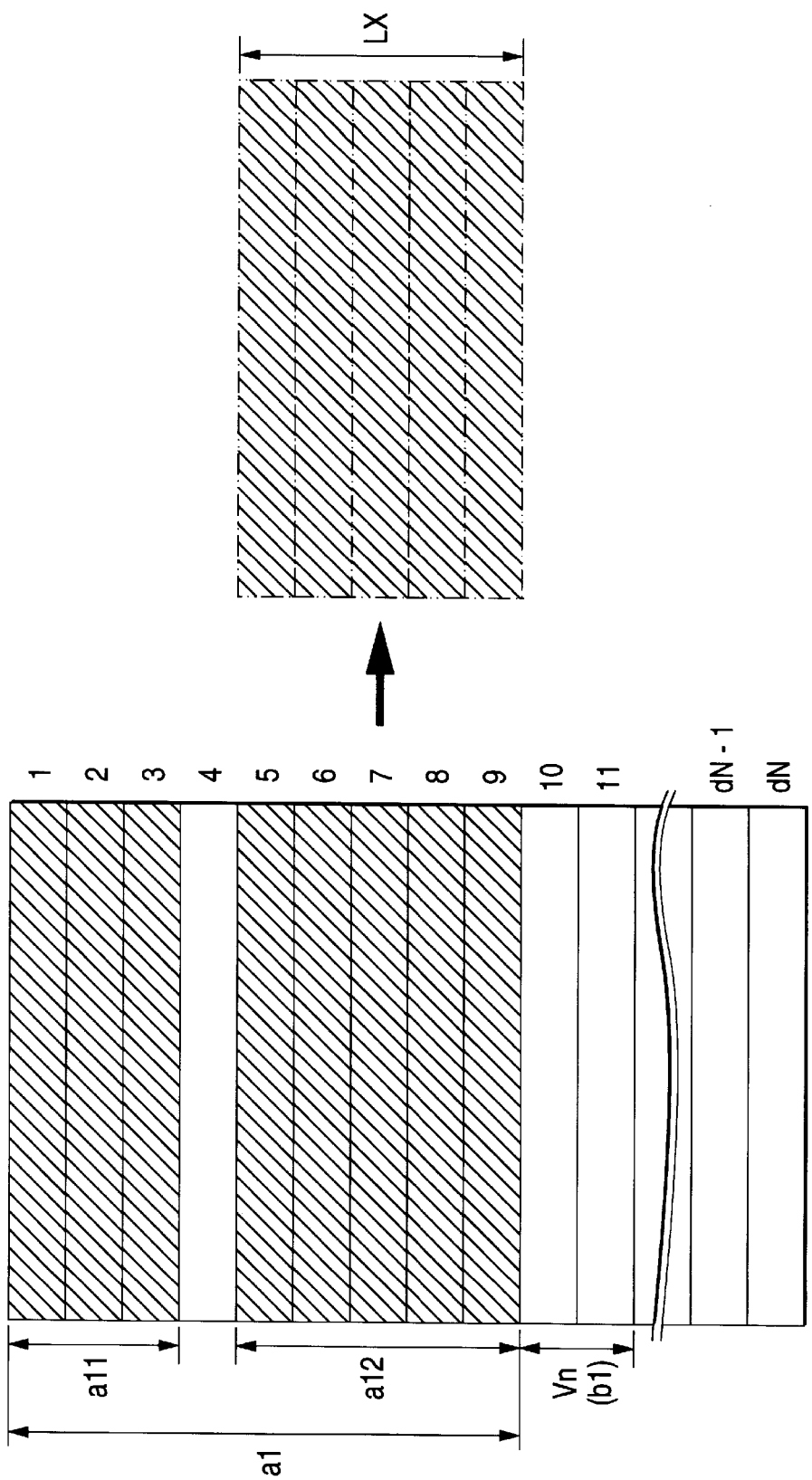
FIG. 12 is a diagram illustrating the estimated number of lines presumably detected as the number of line in a immediately prior printing area.

Subsequently, cases (1)–(3) are integrated and an embodiment of the present invention fit for deciding whether to employ the specialized one-way printing or the specialized two-way printing will be described by reference to a flow-chart of FIG. 11.

A printing block to be printed in the main scanning this time is decided in this algorithm and a printing direction in the next main scanning is decided. In this case, the "printing block" is a concept indicative of a printing range when main scanning is conducted once by the print head 15.

This embodiment of the present invention shows an example of a case where a memory management program is used to output the whole data stored in the input buffer 12 for the printing process; in other words, the embodiment thereof is characterized in that an attempt to shorten printing time is feasible while printing quality is maintained even when only part of the data stored in the input buffer 12 cannot be output.

Since the whole data stored in the input buffer 12 is output for print processing as described above according to this embodiment of the invention, the memory of the input buffer 12 should be high enough only to correspond to the number of dot-forming elements dN of the print head 15. In the second and third embodiments of the present invention, a description will be given of them as those which use such a memory management program as is capable of causing data to be partially read from the input buffer 12.

At Step (hereinafter called "S") 1, first, a decision to be made on the following is based on the vertical printing position data: whether discontinuity width Vn is greater than "1" when the raster data (image data) on each one-dot line transmitted from the host computer 1 is vertically discontinuous. If Vn is smaller than "1", this refers to a case where the image data in the first printing area A1 is vertically continuous. Then "1", is added to the number of lines a1 at S2 and "1" is also added to the number of estimated lines LX.

In this case, the number of estimated lines LX is intended to estimate and detect the number of lines a2 in the second printing area A2. The number of estimated lines LX is grasped as a value at which the line having the image data is continuous in the sub-scanning direction immediately before the detection of the blank area B1. The number of estimated lines LX will be explained with reference to FIG. 12. When two continuous image data as to the number of lines a11 and the number of lines a12 are stored in the input buffer 12, the number of lines a1 in the first printing area A1 is calculated as a11+a12+BN through the process of S11 as will be described later. BN to be added lastly in this case represents the number of lines in the blank between a11 and a12 shown in FIG. 12 (BN=1 in the example of FIG. 12). When discontinuity Vn of two lines, for example, is detected, that is, when the vertical printing position data equivalent to two lines jumps, the number of estimated lines LX is detected as the number of continuous lines having the image data immediately before the detection of the discontinuous Vn, that is, as a value equal to a12 (in the case of FIG. 12, "5" from No. 5 line–No. 9 line; referring to the right side in FIG. 12). Further, the number of estimated lines LX is deemed to be the number of lines a2 in the second printing area A2 in fiction.

Referring to FIG. 11 again, a decision is made on whether the number of lines a1 in the first printing area A1 is greater than the number of dot-forming elements dN at S3 when the image data is continuous. If a1>dN is not established, a return course is followed and if a1>dN is established, S4 is followed.

At S4, the specialized one-way printing is designated according to the printing algorithm of (1) above and the first printing area A1 is printed to the extent of the number of dot-forming elements dN. At S4, further, paper feeding by the number of dot-forming elements dN (P=P+dN) is carried out and the number of lines a1 is reset (a1=0). In this case, "P" represents a basic decision point of the print processing as shown on the right-hand side of FIG. 7. Consequently, P=P+dN means not only paper feeding by dN but also the new detection of the aforesaid printing area A1 (or A1–A3 in other embodiments of the present invention as will be described later) from the new basic decision point.

When the blank line is detected, on the other hand, the "YES" decision is made at S1 and S5 is followed. At S5, the discontinuity width Vn thus detected is set as the number of lines b1 in the first blank area B1. Then at S6, a decision is made on whether the number of lines a1 is "0". If the number of lines a1 is "0", this means immediately after the first printing area A1 is printed. At S7, therefore, paper feeding by the number of lines b1 in the blank area B1 is carried out and a return course is followed.

If the number of lines a1 is not "0", this means the image data in the first printing area A1 to be output for printing is left in the input buffer 12. At S8 then, a decision is made on whether the number of dot-forming elements is not greater than a1+b1. If $dN \leq a1+b1$ is established, this means the print head 15 has not reached the second printing area A2. At S9 then, the specialized two-way printing equivalent to the number of lines a1 is carried out. At S9, further, paper feeding by a1+b1 is carried out, and the number of estimated lines LX and the number of lines a1 are reset (LX=0, a1=0).

When the "NO" decision is made at S8, a decision is made on whether $dN \geq a1+b1+LX$ is established at S10. If the "YES" decision is made at S10, this means the print head 15 has reached the whole second printing area A2 estimated from the first printing area A1—the number of estimated lines LX. Consequently, at S11, a1+b1 is replaced with new a1 according to the printing algorithm of (2) above. At S11, further, the following data line is added to the number of lines a1.

If $dN \geq a1+b1+LX$ is not established, on the other hand, a decision is made on whether the number of dot-forming elements dN is smaller than the number of estimated lines LX at S12. If dN<LX is not established, this means the number of dot-forming elements is not less than the number of estimated lines LX. In this case, the specialized two-way printing is possible. Therefore, S9 is followed and the specialized two-way printing is carried out.

If dN<LX is established, on the other hand, this refers to a case where the specialized two-way printing is impossible since the second printing area A2 estimated from the number of estimated lines LX is large. Consequently, S11 is followed and a1=a1+b1 is replaced, and the number of lines of following data is added to a1. In this case, the specialized one-way printing is carried out at S4. Incidentally, the printing direction designated at S4 and S9 is the direction of the next printing pass.

According to this embodiment of the invention, the printing time can be shortened without deteriorating printing quality even when the memory management program is used to output the whole data stored in the input buffer 12 for the printing process since the number of lines a2 in the second printing area A2 is estimated from the number of estimated lines LX.

Figure 13:
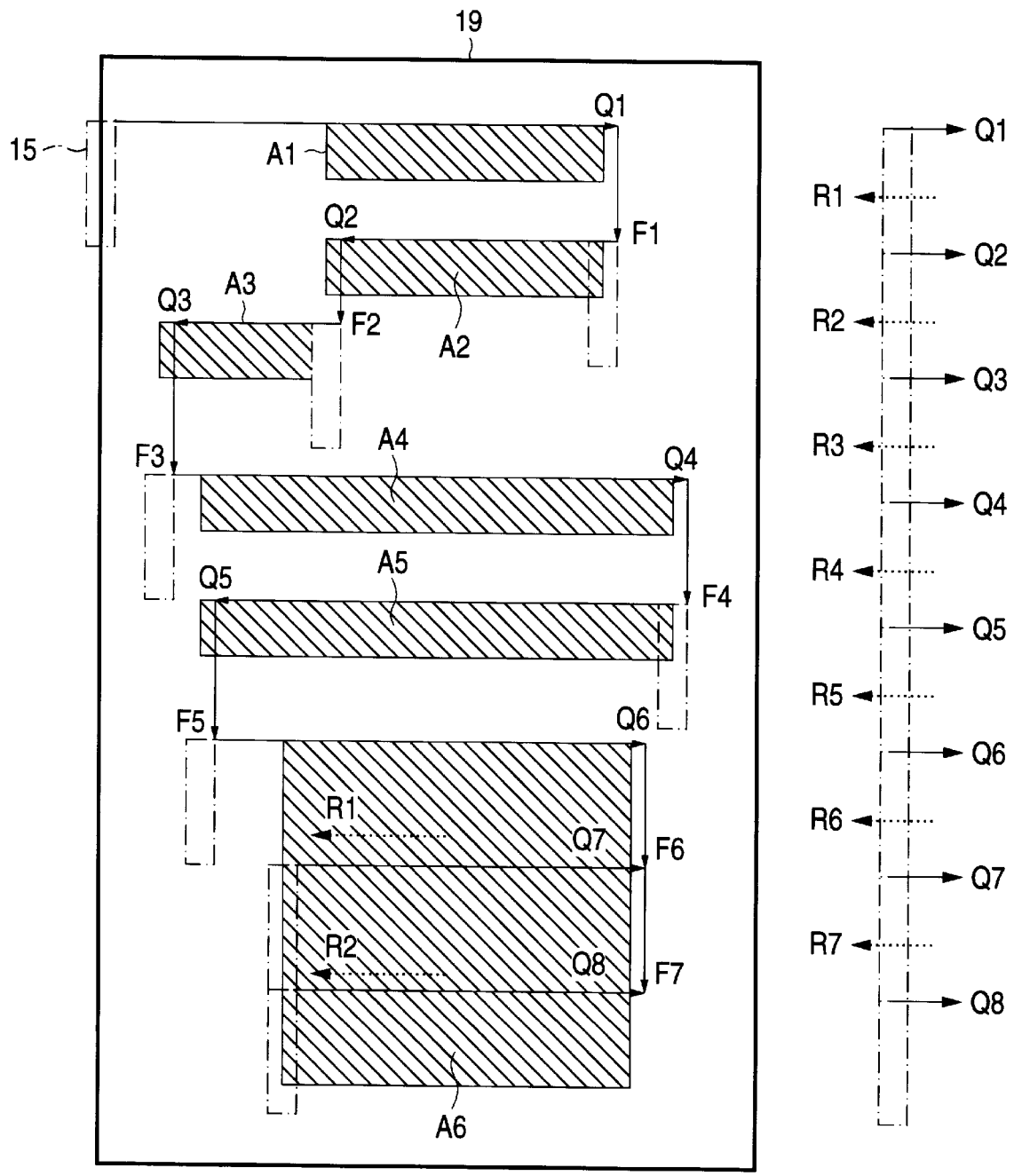
FIG. 13 is a diagram illustrating the printing pass improved according to the present invention in comparison with a printing pass by the art one-way printing.

FIG. 13 is a diagram illustrating the effect obtained according to this embodiment of the invention. The pass and paper feeding are shown on the left-hand side of FIG. 13 when printing is carried out according to this embodiment of the invention, whereas only the pass is shown when the ordinary one-way printing is carried out.

The printing contents on page space 19 comprise a plurality of printing areas A1–A6 including various characters, symbols, block diagrams and so forth. The width of the printing areas A1–A5 is smaller than that of the print head 15. The width of the printing area A6 is greater than that of the print head 15. A1–A5 are printed by the specialized two-way printing through main scanning Q1–Q5 and the last A6 is printed by the specialized one-way printing.

When the main scanning Q1 is transferred to the main scanning Q3 in that case, attention should be directed to the fact that the logical seek functions and the movement of the print head 15 is minimized and besides an optimum printing direction is determined. In other words, in the ordinary two-way printing, the print head 15 is directly moved to the left end of FIG. 13 after the printing area A2 is printed and then the printing area A3 is printed by reversing the scanning direction. Notwithstanding, the movement of the print head 15 from the left end of the printing area A2 up to the left end of the page space 19 in this method is useless. On the other hand, the movement of the print head 15 is minimized in the specialized two-way printing.

The final total number of passes required for printing in this case amounts to "10" as the sum of Q1–Q8 and R1, R2. When the same page space 19 is subjected to the one-way printing, the total number of passes amounts to "15" of Q1–Q8 and R1–R7 as shown on the right-hand side of FIG. 13. Therefore, according to this embodiment of the invention, the printing time can be shortened by a large margin without deteriorating printing quality.

2nd Embodiment

A description will subsequently be given of a second embodiment of the present invention by reference to FIG. 14. This embodiment of the present invention is characterized in that when the memory of the input buffer 12 is equal to less than one page, though it is high enough to exceed the number of dot-forming elements dN of the print head 15, the printing algorithm of (1)–(4) above is realized.

Figure 14:
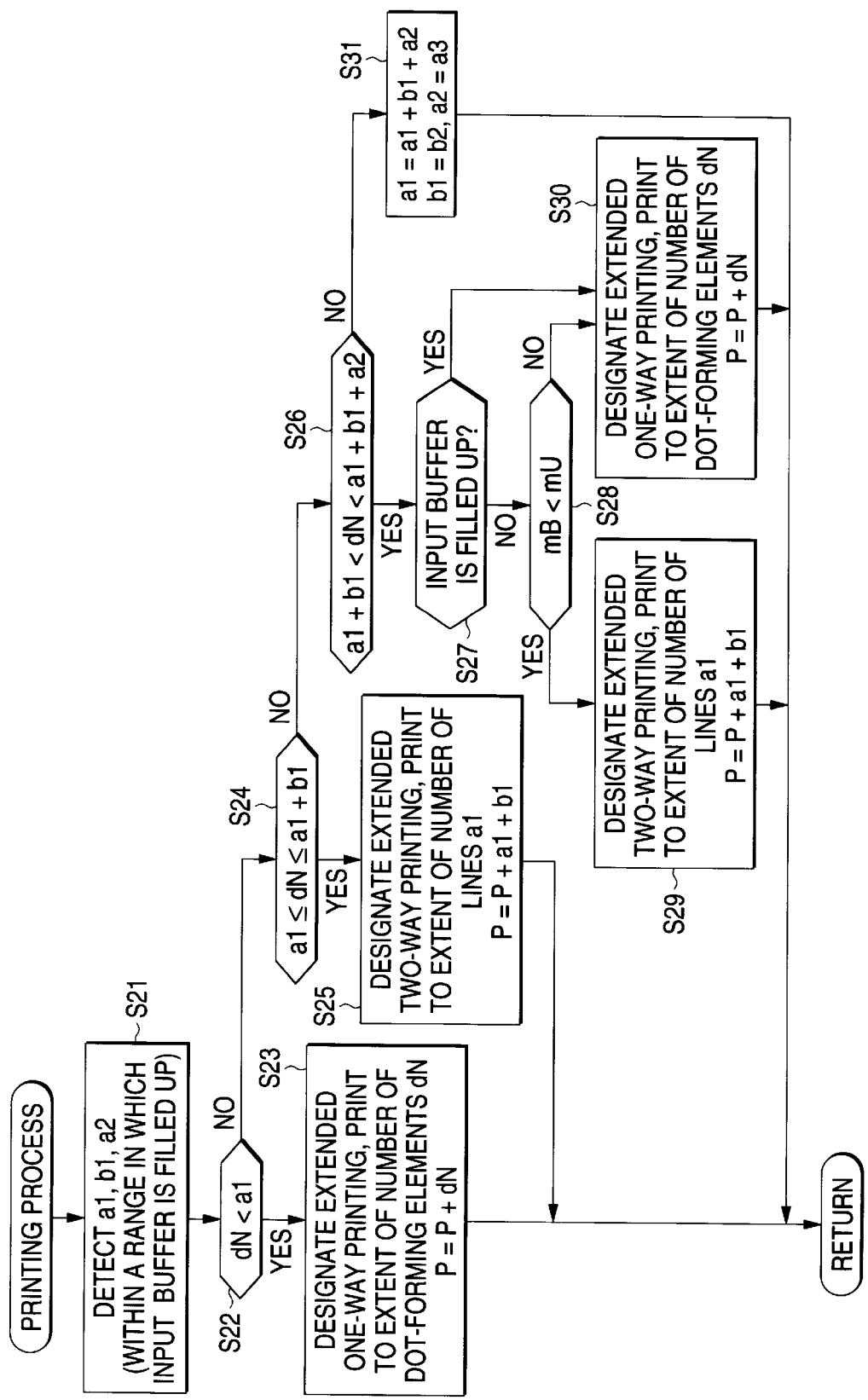
FIG. 14 is a flowchart showing a printing process according to a second embodiment of the present invention.

FIG. 14 shows a flowchart of a printing process according to this embodiment of the invention. At S21, the first printing area A1, the first blank area B1 and the second printing area A2 are detected and so is the number of lines a1, b1, a2 in each area. The dot-pattern data generated by the input buffer 12 is scanned on a line basis, and the addresses of lines having dots as well as the number of lines thereof are detected, whereby the number of lines a1, b1, a2 and each of the areas A1, B1, A2 are made detectable. The number of lines a1, b1, a2, b2 is each stored in a data memory (not shown).

In this case, according to this embodiment of the invention, it is set forth as a premise that the height of the memory of the input buffer 12 is equivalent to less than one page. Consequently, the second printing area A2 and the number of lines a2 are detected within a range in which the input buffer 12 is filled up when the width of the second printing area A2 is long, that is, when the number of lines a2 is large. When the image memory is filled up before the second printing area A2 is detected, the value at that point of time is detected as the number of lines a2 in the second printing area A2.

Subsequently, a decision is made on whether dN<a1 is established at S22. When the number of dot-forming elements dN is smaller than the number of lines a1 in the first printing area A1 as described in (1) above, the two-way printing is not selectable in view of preventing printing quality from being deteriorated. Consequently, if dN<a1 is established, the "YES" decision is made at S22 and S23 is followed. At S23, the specialized one-way printing is designated as a printing direction. At S23, moreover, printing by the number of dot-forming elements dN is carried out and paper feeding by the number of dot-forming elements dN is also carried out.

If the "NO" decision is made at S22, a decision is made on whether $a1 \leq dN \leq a1+b1$ is established at S24. When the first printing area A1 is contained in the print head 15 and when the print head 15 is unable to reach the second printing area A2 as described in (3) above, the specialized two-way printing is possible. If, therefore, a1≦dN≦a1+b1 is established, the "YES" decision is made at S24 and S25 is followed. At S25, the specialized two-way printing is designated and printing equivalent to the number of lines a1 in the first printing area A1 is carried out and paper feeding by a1+b1 is also carried out.

If the "NO" decision is made at S24, a decision is made on whether a1+b1≦dN≦a1+b1+a2 is established at S26. If a1+b1≦dN≦a1+b1+a2 is established, a decision is made on whether the input buffer 12 has been filled up at S27. If it is decided then that the input buffer 12 has not been filled up, this means that the second printing area A2 has totally been detected within the memory capacity of the input buffer 12. In this case, as described in (4) above, the preferable printing direction is determined by the size relation between the value mB obtained by rounding up (a2/dN) into an integer and the value mU obtained by rounding up ((a1+b1+a2)/dN) into an integer.

At S28, therefore, mB and mU are obtained and a decision is made on whether mB<mU is established. If mB<mU is established, the specialized two-way printing is designated and not only printing by the number of lines a1 but also paper feeding by a1+b1 is carried out at S29. If mB<mU is not established, the specialized one-way printing is designated and not only printing by the number of dot-forming elements dN but also paper feeding by dN is carried out at S30.

If it is decided that the input buffer 12 has been filled up at S27, on the other hand, this means the capacity of the input buffer 12 has been used up before the second printing area A2 is totally detected; in other words, the actual number of lines a2 in the second printing area A2 remains indistinct. In this case, therefore, S30 is followed and the specialized one-way printing is carried out. Whether or not the input buffer 12 has been filled up can be detected by recognizing the remaining buffer capacity each time data on the next line is retrieved. Then a flag is kept up when the input buffer 12 is filled up, so that a decision is readily made at S27 by checking the flag.

If the "NO" decision is made at S26, this refers to a case where a1+b1+a2≦dN, that is, the number of dot-forming elements dN ranges over the second printing area A2. Therefore, as described in (2) above, the aforesaid process steps S21–S31 are taken at S31 by making a1+b1+a1 a new a1, making b2 a new b1 and making a3 a new a2.

According to this embodiment of the invention, though the specialized one-way printing is forcibly designated when the whole second printing area A2 is not detectable due to the shortage of the memory of the input buffer 12, the number of printing passes resulting therefrom is still the same as in the usual one-way printing and never becomes greater in number than the number thereof as before. Therefore, according to this embodiment of the invention, fail-safe is secured. Since the memory capacity of the input buffer 12 is reducible, moreover, improvement in not only printing quality but also printing time can be attained while the production cost of the printer controller 9 is being decreased.

3rd Embodiment

Figure 15:
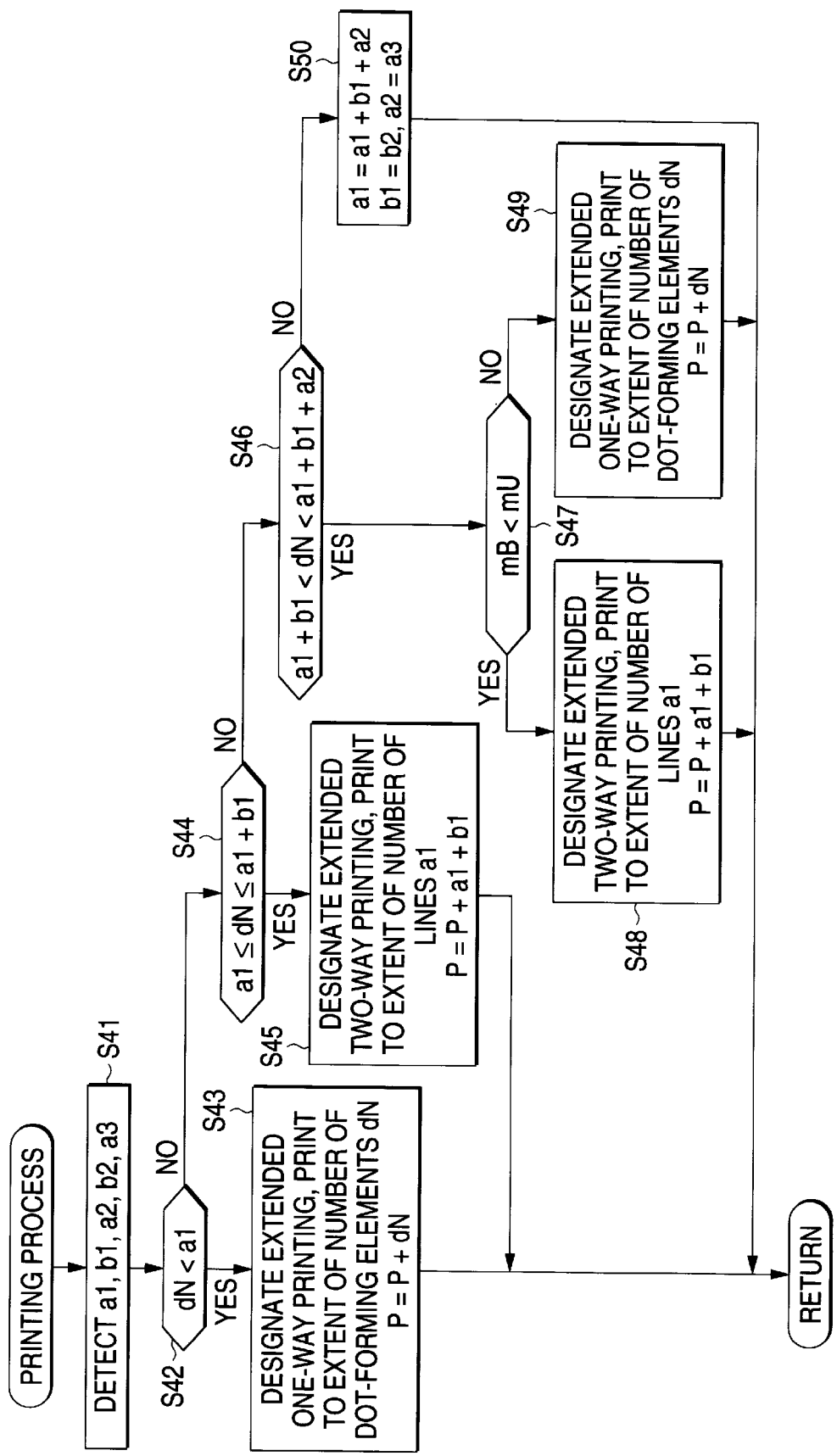
FIG. 15 is a flowchart showing a printing process according to a third embodiment of the present invention.

Referring to FIG. 15, there will subsequently be given a description of a third embodiment of the present invention. This embodiment of the present invention is characterized in that it is applicable to a case where the input buffer 12 has a memory capacity of one page.

Process steps S42–S46 to be taken are similar to S22–S26 in FIG. 14 and process steps S47–S50 are also similar to S28–S31 therein; therefore, the description of them will be omitted.

According to this embodiment of the invention, since it is set forth as a premise to use the input buffer 12 having a capacity of one page, the first printing area A1, the first blank area B1, the second printing area A2, the second blank area B2 and the third printing area A3 are detected so as to obtain the number of lines a1, b1, a2, b2 and a3 in each of the areas A1, B1, A2, B2 and A3 at S41. As the capacity of the input buffer 12 is sufficient, moreover, the decision step taken to decide whether the number of lines a2 in the second printing area A2 is accurately detected as at S27 in FIG. 14 has been omitted.

Even according to this embodiment of the invention thus constituted, the printing time can be shortened while printing quality is being secured.

Figure 16:
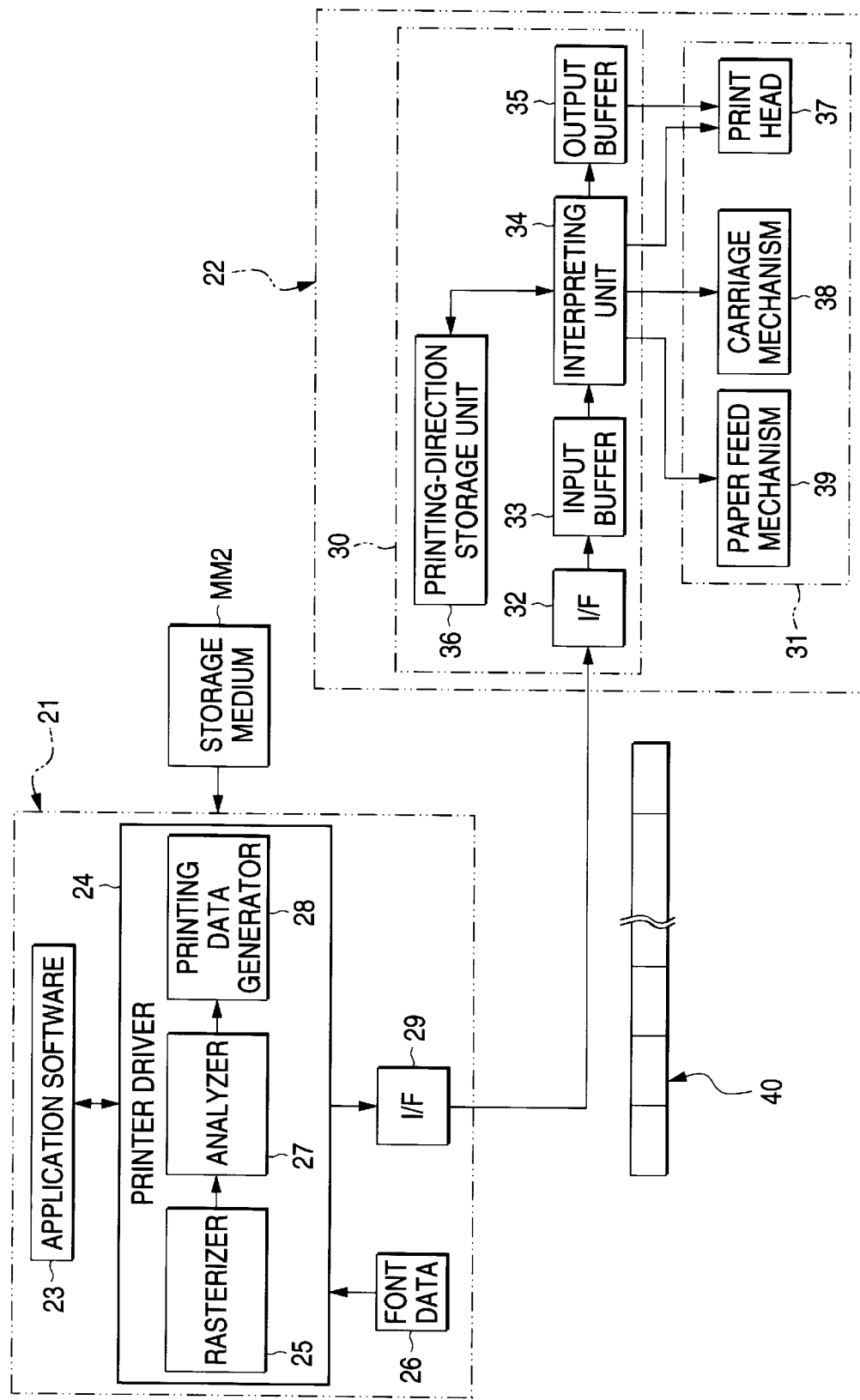
FIG. 16 is a schematic block diagram illustrating the principal part of the present invention applied to a printer driver to be packaged in a host computer.

A description will subsequently be given of a printer driver to be packaged on the host computer side used for attaining the principal part of the present invention by way of example as shown in FIG. 16.

FIG. 16 is a functional block diagram illustrating the principal part of a print system. This print system is designed to obtain optimum printing results by sending printing data 40, which will be described later, generated by a host computer 21 to a printer 22.

A rasterizer 25 develops page-to-page the source code generated by an application software 23 into dot-pattern data on an image memory (not shown) by referring font data 26 and the like. An analyzer 27 analyzes the dot-pattern data according to the aforesaid printing algorithm and finds out optimum printing logic. A printing data generator 28 as a "printing-data generating means" generates printing data 40 according to the result analyzed by the analyzer 27. The printing data 40 thus created is sent via an I/F 29 to the printer 22. The host computer 21 is equipped with memory resources (e.g., including data and image memories) for use in storing and reading out various data at random, and CPU resources such as computer resources (neither of them is shown) for performing operations on data.

In this case, a printer driver 24 is used for implementing the program stored in a storage medium MM2 that the host computer 21 can read when the host computer 21 reads the program. The printer driver 24 utilizes the computer resources of the host computer 21 so as to perform processes necessary for printing.

Like the storage medium MM as described previously, the concept of the storage medium MM2 is such that it includes ROM, RAM, a floppy-disk, a hard disk, a CD-ROM, an IC card, a photomagnetic disk, a magnetic tape and a communication medium.

The printer 22 is constituted of printer controller 30 as a "drive controlling means" and a print engine 31. The printer controller 30 receives the printing data 40 from the host computer 21 via an I/F 32 and stores the printing data 40 thus received in an input buffer 33.

An interpreting unit 34 is designed to interpret the printing data 40 read from the input buffer 33. The interpreting unit 34 sends the dot-pattern data within the printing data 40 to an output buffer 35 and also causes a printing-direction storage unit 36 to store a printing-direction flag according to a printing-direction command within the printing data 40.

Further, the interpreting unit 34 feeds into each element of a print engine 31 vertical printing position data (printing position in the sub-scanning direction), horizontal printing position data (printing position in the main scanning direction) and a print start command within the printing data 40.

In this case, attention ought to be directed to the fact that a decision on the direction of printing data, that is, on whether the specialized two-way printing or the specialized one-way printing is carried out is made by the analyzer 27 of the printer driver 24.

The print engine 31 of an ink-jet type, for example, is equipped with a print head 37, a carriage mechanism 38 and a paper feed mechanism 39. In the print head 37 like the print head 15, a number of dot-forming elements are formed in the sub-scanning direction. As in the preceding embodiment of the invention, the carriage mechanism 38 includes a carriage, a carriage motor and the like. The paper feed mechanism 17 includes a paper feed roller, a paper feed motor and the like.

4th Embodiment

At S61, first, the first printing area A1, the first blank area B1, the second printing area A2, the second blank area B2 and the third printing area A3 are detected so as to obtain the number of lines a1, b1, a2, b2 and a3 in each of the areas A1, B1, A2, B2 and A3. The rasterizer 25 scans the dot-pattern data developed on the image memory on a line basis and detects the addresses of lines having dots as well as the number of lines thereof so as to detect the number of lines a1, b1, a2, b2 and a3 in each of the areas A1, B1, A2, B2 and A3. The number of lines a1, b1, a2, b2 and a3 is stored in a data memory (not shown).

In this case, process steps S62–S70 to be taken are similar to S42–S50 as described with reference to FIG. 15. Therefore, the description given of the preceding embodiment of the present invention with reference to S42–S50 will be invoked in describing the specific contents of process steps S62–S70.

Figure 17:
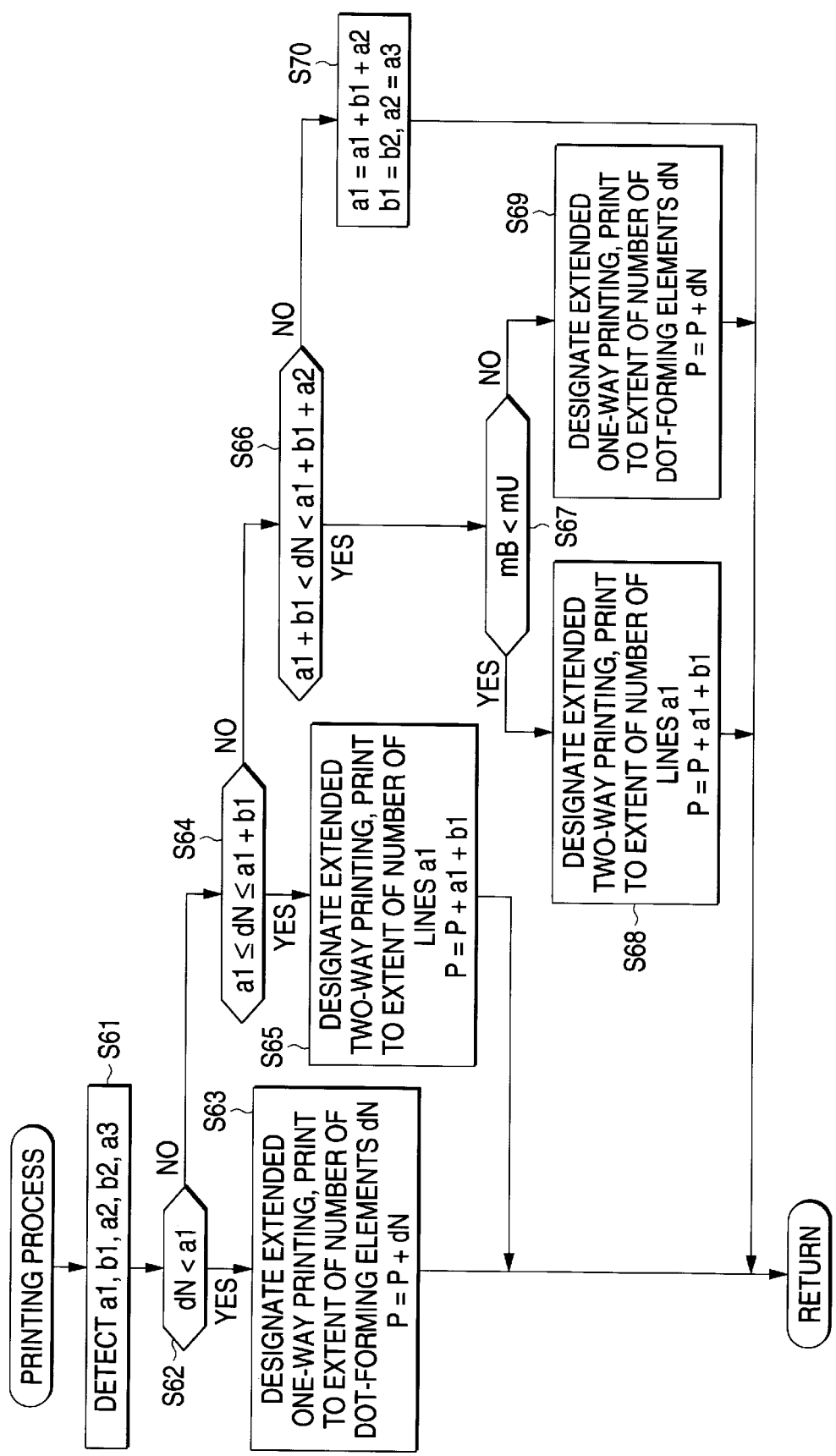
FIG. 17 is a flowchart showing a printing process according to a fourth embodiment of the present invention.

However, according to this embodiment of the invention, the printer driver 24 is used for analyzing the dot-pattern data in order to determined optimum printing logic, whereby printing data for implementing optimum printing is created. Consequently, process steps S63, S65, S68 and S69 in FIG. 17 are different from those described in FIG. 15 in that the printing data for implementing the determined printing logic is created. S63, S65, S68 and S69 are not intended to have the printing operation performed finally but to create the printing data only.

More specifically, at S63, the printing data 40 is created so that the specialized one-way printing is designated as a printing direction and not only printing equivalent to the number of dot-forming elements dN but also paper feeding by the number of dot-forming elements dN is carried out. At S65, the printing data 40 is created so that the specialized two-way printing is designated and not only printing equivalent to the number of lines a1 in the first printing area A1 but also paper feeding by a1+b1 is carried out. At S68, the printing data 40 is created so that the specialized two-way printing is designated and not only printing equivalent to the number of lines a1 but also paper feeding by a1+b1 is carried out. At S69, the printing data 40 is created so that the specialized one-way printing is designated and not only printing equivalent to the number of dot-forming elements dN but also paper feeding by dN is carried out.

Figure 18:
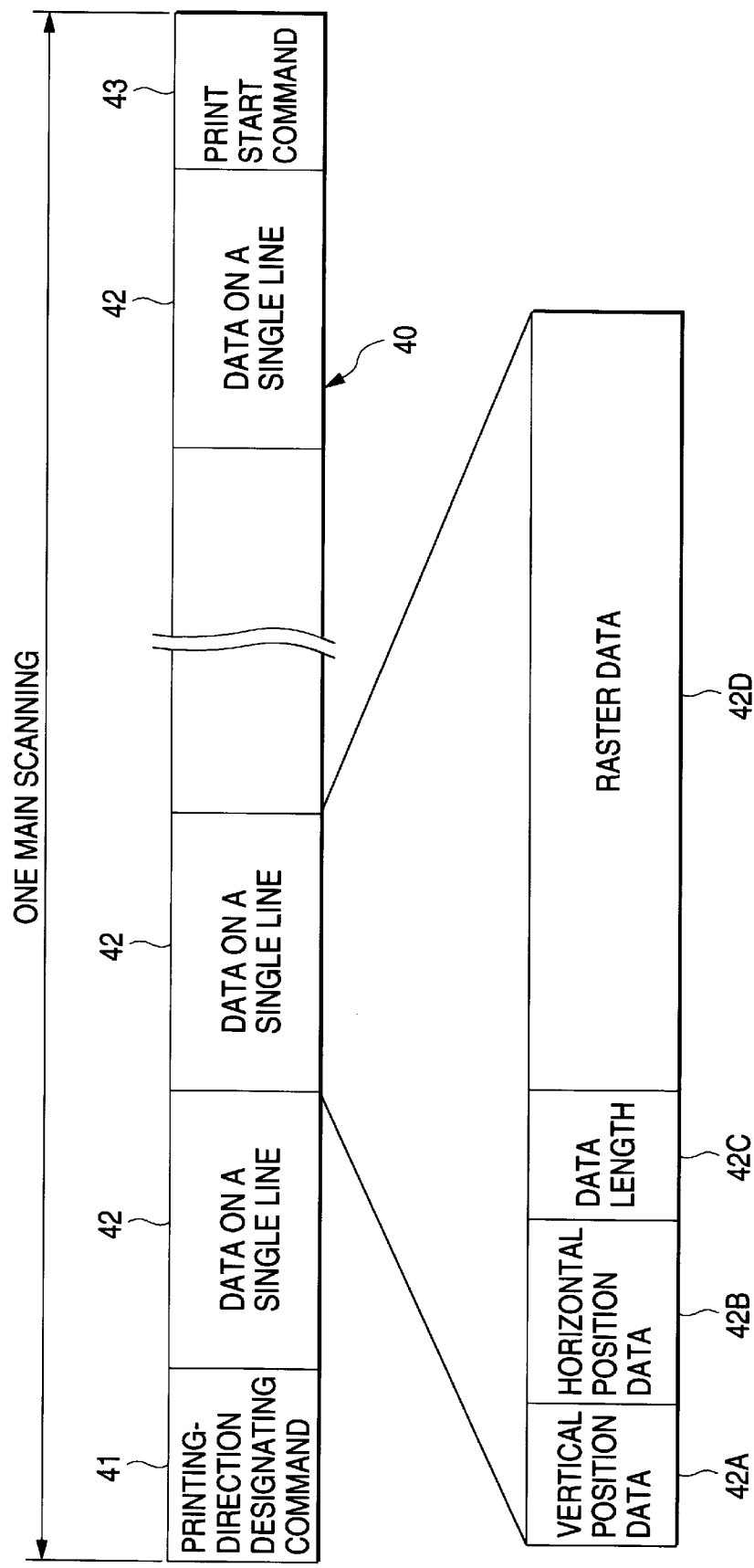
FIG. 18 is a diagrammatic illustration of printing data structure.

In FIG. 18, there is shown an example of the structure of the printing data 40 created after the printing block and the printing direction are determined.

The printing data 40 is the data printed when the main scanning is conducted once by the print head 37. The printing data 40 comprises a printing-direction designating command 41 as a "printing-direction command" for designating whether printing data 40 to be printed through the next main scanning is printed by the specialized two-way printing or the specialized one-way printing, data 42 on a single line or a plurality of lines, and a print start command 43.

The data equivalent to one line comprises vertical position data 42A indicating a vertical position where printing is started, horizontal position data 42B indicating a horizontal position where printing is started, data length 42C indicating kinds of data and data length, and raster data 42D. In this case, the printing direction of printing data 40 equivalent to the next scanning is designated by the printing-direction designating command 41 and simultaneously the data block equivalent to the scanning this time by inserting the print start command 43 is determined.

The interpreting unit 34 in the printer 22 interprets the printing data 40 received from the printer driver 24 and stores the printing direction through the next main scanning in the printing-direction storage unit 16 on the basis of the contents of the printing-direction designating command 41. Further, the interpreting unit 34 feeds the raster data 42D within the data 42 equivalent to each line into the output buffer 35. The printer 22 moves the carriage in the main scanning direction according to the print start command 43 and starts the printing operation. Consequently, there often occurs a case where the printer 22 starts the printing operation without waiting for data equivalent to the total number of dot-forming elements of the print head 37 to be accumulated in the output buffer 35.

According to this embodiment of the invention, the dot-pattern data developed by the printer driver 24 of the host computer 21 is analyzed according to the printing algorithms of (1)–(4), and the printing data 40 obtained according to the analyzed results is fed into the printer 22, so that the printing time is made reducible by obviating unnecessary printing passes while printing quality is prevented from being deteriorated.

5th Embodiment

Figure 19:
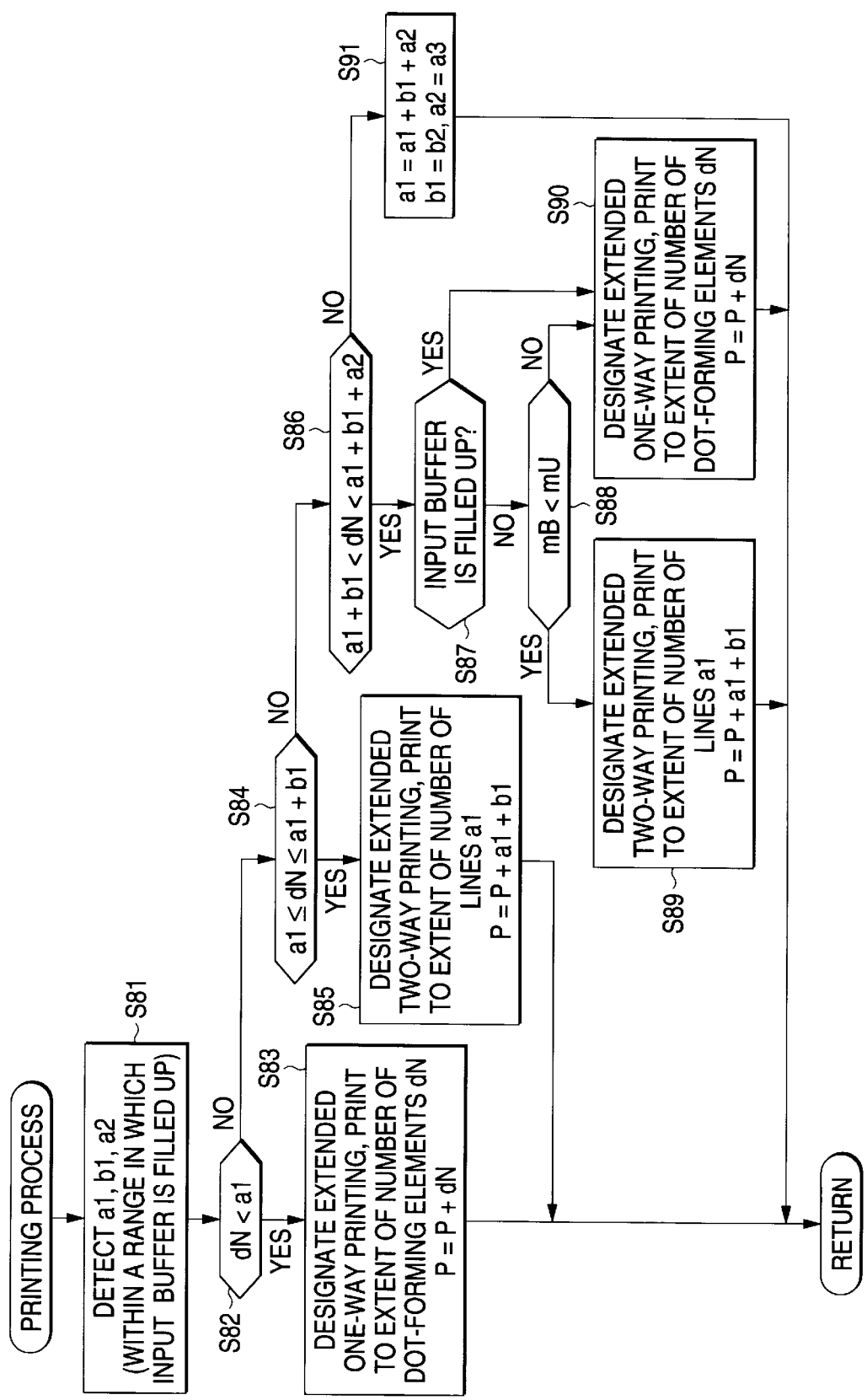
FIG. 19 is a flowchart showing a printing process according to a fifth embodiment of the present invention.

Referring to FIG. 19, there will be given a fifth embodiment of the present invention. This embodiment of the present invention is characterized in that printing algorithms of the aforesaid (1)–(4) are made attained when the printer driver 24 is unable to sufficiently utilize the image memory on the host computer 21 so as to develop dot-pattern data.

FIG. 19 is a flowchart of printing process steps. In this case, process steps S81–S91 to be taken are similar to S21–S31 as described with reference to FIG. 14. Therefore, the description given of the preceding embodiment of the present invention with reference to S21–S31 will be invoked in describing the specific contents of process steps S81–S91.

However, as described in the fourth embodiment of the present invention, this embodiment thereof is intended to create a preferable printing data 40 to be transmitted to the printer 22. Therefore, the printing data 40 is created so that printing logic at S83, S85, S89 and S90 is realized.

According to this embodiment of the invention, it is possible to carry out printing most suitably while the total number of printing passes even when the utilizable memory capacity of the printer driver 24 is restricted.

The present invention may be implemented in various manners without departing the spirit and principal features thereof. Therefore, it is to be understood that the phraseology or terminology employed herein is for the purpose of description and not of limitation. The scope of the invention is to be determined solely by the following claims without being restricted by the description given in this specification.

For example, each of the areas A1, A2, B1 and the like together with the number of lines only may be detected on the printer driver side, whereas a decision on printing logic based on the number of lines may be made on the printer side. With the aforesaid printing algorithm as an initial set value, it may be arranged that when such an algorithm is designated by the user, priority is given to what is designated by the user. Any one of the modified embodiments included in the appended claims is within the scope of the present invention.

What is claimed is:

1. A print system for embodying printing contents on a recording medium, comprising:

a host computer;

a printer which is coupled to the host computer and has a print head formed with a plurality of dot-forming elements therein;

dot-pattern data generating means for generating dot-pattern data according to the printing contents;

area detecting means for detecting the number of lines in each of at least two printing areas each time the print head conducts main scanning by detecting the presence or absence of dots of the dot-pattern data on a line basis, the two printing areas being obtainable separately with a blank area therebetween with lines free from being printed;

printing-direction decision means for deciding a printing block to be printed through the next main scanning, and for selecting one of the following two printing direction modes: (A) specialized one-way printing for printing a printing block in the same direction as the direction of an immediately prior printing pass or (B) specialized two-way printing for printing the printing block in a direction in which the movement of the print head becomes minimized in value, based on the relation between the number of lines in each of the printing and blank areas and the number of dot-forming elements of the print head; and drive control means for controlling at least the driving of the print head according to the result decided by the printing-direction decision means.

2. The print system according to claim 1, wherein the following condition is given that: the number of lines in a first printing area to be initially detected out of the printing areas is a1; the number of lines in a second printing area to be detected next to the first printing area is a2; the number of lines in the blank area is b1; and the number of dot-forming elements of the print head is dN, and whereby the printing-direction decision means performs the following processes according to the respective condition:

(1) when dN<a1 is established, the printing-direction decision means selects the specialized one-way printing;

(2) when a1≦dN≦a1+b1 is established, the printing-direction decision means selects the specialized two-way printing;

(3) when a1+b1<dN<a1+b1+a2 is established, the printing-direction decision means further compares an integer mB obtainable by rounding up a2/dN with an integer mU obtainable by rounding up (a1+b1+a2)/dN, and selects the specialized two-way printing when mB<mU is established so as to print the first printing area, and the specialized one-way printing when mB<mU is not established; and (4) when a1+b1+a2≦dN is established, the printing-direction decision means replaces a1+b1+a2 with new a1 to make a decision again.

3. The print system according to claim 2, wherein, when a1+b1<dN<a1+b1+a2 is established, the printing-direction decision means makes a decision on whether it has totally detected the second printing area; and on deciding that the second printing area has not totally been detected yet, the printing-direction decision means selects the specialized one-way printing; and on deciding that the second printing area has totally been detected, the printing-direction decision means compares the integer mB with the integer mU, and selects the specialized two-way printing when mB<mU is established, and the specialized one-way printing when mB<mU is not established.

4. The print system according to claim 1, wherein the area detecting means detects the number of estimated lines in order to assume the number of lines in the printing area which follows the blank area from among the printing areas to be equal the number of lines in the printing area situated immediately before the printing area which follows the blank area.

5. The print system according to claim 4, wherein the following condition is given that: the number of lines in a printing area to be initially detected out of the printing areas is a1; the number of lines in the blank area is b1; the number of estimated lines is LX; and the number of dot-forming elements of the print head is dN, and whereby the printing-direction decision means performs the following processes according to the respective condition:

(1) when dN<a1 is established, the printing-direction decision means selects the specialized one-way printing;

(2) when a1≦dN≦a1+b1 is established, the printing-direction decision means selects the specialized two-way printing;

(3) when a1+b1<dN<a1+b1+LX is established, the printing-direction decision means further makes a decision on whether dN<LX is established and selects the specialized two-way printing when dN<LX is not established, and replaces a1+b1 with new a1 to make a decision again when dN<LX is established; and (4) when a1+b1+LX≦dN is established, the printing-direction decision means replaces a1+b1 with new a1 to make a decision again.

6. The print system according to claim 1, wherein the printer has all of the dot-pattern data generating means, the area detecting means, the printing-direction decision means and the drive control means.

7. The print system according to claim 1, wherein the dot-pattern data generating means, the area detecting means and the printing-direction decision means are provided on the host computer side.

8. The print system according to claim 7, wherein the dot-pattern data generating means, the area detecting means and the printing-direction decision means are accomplished by a printer driver, and the printer driver has printing-data generating means for generating printing data by adding at least a printing-direction command for indicating the printing direction identified by the printing-direction decision means to dot-pattern data corresponding to the printing block.

9. A program recording medium for storing a computer program for controlling the driving of a print head, the computer program being readable and understandable with a computer, comprising program code means of:

dot-pattern data generating means for generating dot-pattern data according to printing contents;

area detecting means for detecting the number of lines in each of at least two printing areas each time the print head conducts main scanning by detecting the presence or absence of dots of the dot-pattern data on a line basis, the two printing areas being obtainable separately with a blank area therebetween with lines free from being printed; and printing-direction decision means for deciding a printing block to be printed through the next main scanning, and for selecting one of the following two printing direction modes: (A) specialized one-way printing for printing a printing block in the same direction as the direction of an immediately prior printing pass or (B) specialized two-way printing for printing the printing block in a direction in which the movement of the print head becomes minimized in value, based on the relation between the number of lines in each of the printing and blank areas and the number of dot-forming elements of the print head.

10. The program recording medium according to claim 9, wherein the following condition is given that: the number of lines in a first printing area to be initially detected out of the printing areas is a1; the number of lines in a second printing area to be detected next to the first printing area is a2; the number of lines in the blank area is b1; and the number of dot-forming elements of the print head is dN, and whereby the printing-direction decision means performs the following processes according to the respective condition:

(1) when dN<a1 is established, the printing-direction decision means selects the specialized one-way printing;

(2) when a1≦dN≦a1+b1 is established, the printing-direction decision means selects the specialized two-way printing;

(3) when a1+b1<dN<a1+b1+a2 is established, the printing-direction decision means further compares an integer mB obtainable by rounding up a2/dN with an integer mU obtainable by rounding up (a1+b1+a2)/dN, and selects the specialized two-way printing when mB<mU is established so as to print the first printing area, and the specialized one-way printing when mB<mU is not established; and (4) when a1+b1+a2≦dN is established, the printing-direction decision means replaces a1+b1+a2 with new a1 to make a decision again.

11. The program recording medium according to claim 10, wherein, when a1+b1<dN<a1+b1+a2 is established, the printing-direction decision means makes a decision on whether it has totally detected the second printing area; and on deciding that the second printing area has not totally been detected yet, the printing-direction decision means selects the specialized one-way printing; and on deciding that the second printing area has totally been detected, the printing-direction decision means compares the integer mB with the integer mU, and selects the specialized two-way printing when mB<mU is established, and the specialized one-way printing when mB<mU is not established.

12. The program recording medium according to claim 9, wherein the area detecting means detects the number of estimated lines in order to assume the number of lines in the printing area which follows the blank area from among the printing areas to be equal the number of lines in the printing area situated immediately before the printing area which follows the blank area.

13. The program recording medium according to claim 12, wherein the following condition is given that: the number of lines in a printing area to be initially detected out of the printing areas is a1; the number of lines in the blank area is b1; the number of estimated lines is LX; and the number of dot-forming elements of the print head is dN, and whereby the printing-direction decision means performs the following processes according to the respective condition:

(1) when dN<a1 is established, the printing-direction decision means selects the specialized one-way printing;

(2) when a1≦dN≦a1+b1 is established, the printing-direction decision means selects the specialized two-way printing;

(3) when a1+b1<dN<a1+b1+LX is established, the printing-direction decision means further makes a decision on whether dN<LX is established and selects the specialized two-way printing when dN<LX is not established, and replaces a1+b1 with new a1 to make a decision again when dN<LX is established; and (4) when a1+b1+LX≦dN is established, the printing-direction decision means replaces a1+b1 with new a1 to make a decision again.

14. A printer driver for generating printing data for embodying printing contents on a recording medium by controlling the driving of a print head having a plurality of dot-forming elements, comprising:

dot-pattern data generating means for generating dot-pattern data according to the printing contents;

area detecting means for detecting the number of lines in each of at least two printing areas each time the print head conducts main scanning by detecting the presence or absence of dots of the dot-pattern data on a line basis, the two printing areas being obtainable separately with a blank area therebetween with lines free from being printed;

printing-direction decision means for deciding a printing block to be printed through the next main scanning, and for selecting one of the following two printing direction modes: (A) specialized one-way printing for printing a printing block in the same direction as the direction of an immediately prior printing pass or (B) specialized two-way printing for printing the printing block in a direction in which the movement of the print head becomes minimized in value, based on the relation between the number of lines in each of the printing and blank areas and the number of dot-forming elements of the print head; and printing-data generating means for generating the printing data by adding at least a printing-direction command for indicating a printing direction identified by the printing-direction decision means to dot-pattern data corresponding to the printing block.

15. A printer for embodying printing contents on a recording medium by controlling the driving of a print head having a plurality of dot-forming elements, comprising:

printing-data receiving means for receiving printing data;

dot-pattern data generating means for generating dot-pattern data according to the printing data received;

area detecting means for detecting the number of lines in each of at least two printing areas each time the print head conducts main scanning by detecting the presence or absence of dots of the dot-pattern data on a line basis, the two printing areas being obtainable separately with a blank area therebetween with lines free from being printed;

printing-direction decision means for deciding a printing block to be printed through the next main scanning, and for selecting one of the following two printing direction modes: (A) specialized one-way printing for printing a printing block in the same direction as the direction of an immediately prior printing pass or (B) specialized two-way printing for printing the printing block in a direction in which the movement of the print head becomes minimized in value, based on the relation between the number of lines in each of the printing and blank areas and the number of dot-forming elements of the print head; and drive control means for controlling at least the driving of the print head according to the result decided by the printing-direction decision means.

16. A printing method for embodying printing contents on a recording medium by controlling the driving of a print head having a plurality of dot-forming elements, comprising the steps of:

generating a dot pattern;

detecting an area by detecting the number of lines in each of at least two printing areas each time the print head conducts main scanning by detecting the presence or absence of dots of the dot-pattern data on a line basis, the two printing areas being obtainable separately with a blank area therebetween with lines free from being printed;

deciding a printing block to be printed through the next main scanning, based on the relation between the number of lines in each of the printing and blank areas and the number of dot-forming elements of the print head; and selecting one of the following two printing direction modes: (A) specialized one-way printing for printing a printing block in the same direction as the direction of an immediately prior printing pass or (B) specialized two-way printing for printing the printing block in a direction in which the movement of the print head becomes minimized in value, based on the relation between the number of lines in each of the printing and blank areas and the number of dot-forming elements of the print head.

* * * * *